(12) United States Patent
Smith et al.

(10) Patent No.: US 10,547,630 B2
(45) Date of Patent: Jan. 28, 2020

(54) SYSTEMS AND METHOD FOR PROVIDING DYNAMIC COMPUTER NETWORKS IN WHICH GOAL INDUCED DYNAMIC MODIFICATIONS TO MISSION PLANS OCCUR

(71) Applicant: HARRIS CORPORATION, Melbourne, FL (US)

(72) Inventors: Wayne B. Smith, Melbourne Beach, FL (US); Richard E. Six, Pylesville, MD (US)

(73) Assignee: Harris Corporation, Melbourne, FL (US)

( * ) Notice: Subject to any disclaimer, the term of this patent is extended or adjusted under 35 U.S.C. 154(b) by 329 days.

(21) Appl. No.: 15/362,936

(22) Filed: Nov. 29, 2016

(65) Prior Publication Data
US 2018/0152469 A1    May 31, 2018

(51) Int. Cl.
*H04L 29/06*    (2006.01)
(52) U.S. Cl.
CPC ...... *H04L 63/1433* (2013.01); *H04L 63/1441* (2013.01)
(58) Field of Classification Search
None
See application file for complete search history.

(56) References Cited

U.S. PATENT DOCUMENTS

| | | | |
|---|---|---|---|
| 9,043,922 B1* | 5/2015 | Dumitras | G06F 21/577 726/25 |
| 9,258,321 B2 | 2/2016 | Amsler et al. | |
| 9,414,776 B2 | 8/2016 | Sillay et al. | |
| 2011/0185432 A1* | 7/2011 | Sandoval | G06F 21/554 726/25 |
| 2012/0150965 A1* | 6/2012 | Wood | H04L 51/12 709/206 |
| 2015/0127790 A1* | 5/2015 | Smith | H04L 41/0816 709/221 |
| 2015/0295948 A1* | 10/2015 | Hassell | H04L 63/1441 726/25 |
| 2016/0255115 A1* | 9/2016 | Mital | H04L 63/1433 726/1 |

* cited by examiner

*Primary Examiner* — Henry Tsang
(74) *Attorney, Agent, or Firm* — Fox Rothschild LLP; Robert J. Sacco; Carol E. Thorstad-Forsyth

(57) ABSTRACT

Systems and methods for controlling operations of a computer network (100). The methods involve: generating programming instructions implementing a first mission plan (2100) specifying which identity parameters of packets are to be transformed during specific time periods; executing the programming instructions by at least one node (105) of the computer network to dynamically transform true values, which correctly represent the identity parameters of the packets, into false values which incorrectly represent the identity parameters of the packets; measuring an effectiveness of the computer network's behavior with regard to a recognition and prevention of cyber-attack success resulting from the execution of the programming instructions by the node; and dynamically modifying the first mission plan based on the measured effectiveness.

19 Claims, 31 Drawing Sheets

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 13

Mission Plan 2100

Variable Identity Parameter: Mission Model 2102
IP Address
- Network Device $ND_1$
  True Value $TV_1$ = 175.18.252.1         Active, Timeslot $TS_2$
  False Value $FV_{1-1}$ = 176.18.252.1    Empty
  False Value $FV_{1-2}$ = 175.18.252.2    Active, Timeslot $TS_5$
  False Value $FV_{1-3}$ = 176.18.253.1    Active, Timeslot $TS_1$
  False Value $FV_{1-4}$ = 177.18.252.2    Active, Timeslot $TS_4$
  False Value $FV_{1-5}$ = 178.18.254.1    Empty
  False Value $FV_{1-6}$ = 179.20.252.3    Empty
  False Value $FV_{1-7}$ = 177.18.262.5    Active, Timeslot $TS_3$
  False Value $FV_{1-8}$ = 179.12.263.7    Empty
- Network Device $ND_2$
  True Value $TV_2$ = 172.14.236.7         Active, Timeslot $TS_5$
  False Value $FV_{2-1}$ = 176.18.252.1    Active, Timeslot $TS_1$
  False Value $FV_{2-2}$ = 178.18.254.1    Active, Timeslot $TS_2$
  False Value $FV_{2-3}$ = 179.20.252.3    Active, Timeslot $TS_3$
  False Value $FV_{2-4}$ = 179.12.263.7    Active, Timeslot $TS_4$
  False Value $FV_{2-5}$ = 172.16.242.9    Empty
  False Value $FV_{2-6}$ = 170.18.251.3    Empty
  False Value $FV_{2-7}$ = 170.20.242.1    Empty
  False Value $FV_{2-8}$ = 172.14.262.1    Empty Shadow Networking Activities:
Empty: Drop Packet, Forward To IA - Log Packet Activity
Old: Forward To IA - Log Packet Activity, Send Response

FIG. 21

| Header | | |
|---|---|---|
| Operational Dashboard Metrics | Timeframe Details | • Date range and time frame(s) |
| | Architecture Details | • CBM definition(s) (including behavior models, tactics and tenants of entice, deceive, evade, protect, reveal, harvest, and respond). Maneuverspace definition. Shadow Networking definition<br>• Network architecture (typically with a diagram), maneuver locations, points and associated mission models within the architecture. This metric is typically a pointer to a set of baselines architecture and maneuver drawings |
| | Effectiveness Details | • # of maneuvered elements. Maneuver space size. Cyber maneuver density (# Elements/Man space). Maneuver velocity (maneuver period). Density change velocity ((D1/D2)/time). # of good communication vectors. # of attacks vectors stopped. # of attacks in Shadow networking. Effectiveness (for example: # of attacks stopped / # of good comms) |
| Operational Insight Metrics | Strength and weakness Details | • Date/Time, CBM, MM,<br>• Attack vector name (label). Which Shadow networking element capture location.<br>• Instance of a specific time. CBM name which caught each attack vector. CBM tactic which caught the attack, CBM tenet which caught the attack<br>• Included background information for 2nd degree correlation. # of maneuvered elements. Maneuver space size. Cyber maneuver density (# Elements/Man space). Maneuver velocity (maneuver period). Density change velocity ((D1/D2)/time). # of good communication vectors. # of attacks vectors stopped. # of attacks in Shadow networking. Effectiveness (for example: # of attacks stopped / # of good comms) |

FIG. 29

SYSTEMS AND METHOD FOR PROVIDING DYNAMIC COMPUTER NETWORKS IN WHICH GOAL INDUCED DYNAMIC MODIFICATIONS TO MISSION PLANS OCCUR

BACKGROUND

Statement of the Technical Field

The present disclosure relates to computer network security. More particularly, the present disclosure concerns methods and systems for providing dynamic computer networks in which behavior models drive cyber mission models.

Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency ("DARPA") Information Assurance ("IA") Program has performed initial research in the area of dynamic network defense. A technique was developed under the Information Assurance Program to dynamically reassign Internet Protocol ("IP") address space feeding into a pre-designated network enclave for the purpose of confusing any would-be adversaries observing the network. This technique is called dynamic network address transformation ("DYNAT"). An overview of the DYNAT technology was presented in a published paper by DARPA entitled Dynamic Approaches to Thwart Adversary Intelligence (2001).

SUMMARY

The present disclosure concerns systems and methods for controlling operations of a computer network. The methods comprise generating, by a first computing device, programming instructions implementing a first mission plan specifying which identity parameters of packets are to be transformed during specific time periods. Each identity parameter of the identity parameters uniquely identifies hardware and software of at least one first node of the computer network. The programming instructions are then executed by at least one second node of the computer network to dynamically transform true values, which correctly represent the identity parameters of the packets, into false values which incorrectly represent the identity parameters of the packets. An effectiveness of the computer network's behavior (with regard to recognition and prevention of cyber-attack success resulting from the execution of the programming instructions by the at least one second node) is measured. The first mission plan is dynamically modified based on the measured effectiveness. The dynamic modification of the first mission plan may comprise: dynamically transforming the first mission plan into a second mission plan based on the measured effectiveness; dynamically modifying at least one parameter of the first mission plan based on the measured effectiveness; and/or replacing the first mission plan with a second mission plan based on the measured effectiveness.

In some scenarios, the effectiveness is measured by collecting information indicating how well the computer network's behavior mimics a desired behavior and/or how well the computer network's behavior meets a mission objective. The information includes at least one of a distance vector, an attack vector, a Cyber Behavior Model ("CBM") metric, a network metric, a data metric, and a cost metric.

In those or other scenarios, the effectiveness is determined in accordance with the following mathematical equation $$A_{PROBABILITY} = f(x) \cdot (N_{ATTACKS}/M_{SPACE})$$

wherein $A_{PROBABILITY}$ represents the probability of a cyber-attack, $N_{ATTACKS}$ represents a number of cyber-attacks, $M_{SPACE}$ represents a maneuver space, and $f(x)$ is a function. Function $f(x)$ comprises at least one of a maneuver variable and a cost variable.

In those or other scenarios, the effectiveness is determined based on a relationship between the computer network's behavior and an amount of change in a number of cyber-attacks on the computer network. For example, the effectiveness is determined based on a mathematical expression $X_0 < N_{ATTACKS} < X_1$, where $X_0$ and $X_1$ are pre-defined integers. The mission plan is dynamically modified when $N_{ATTACKS} > X_1$ to decrease a total number of successful cyber-attacks on the computer network.

BRIEF DESCRIPTION OF THE DRAWINGS

The present solution will be described with reference to the following drawing figures, in which like numerals represent like items throughout the figures.

FIG. 13 is a table that is useful for understanding some of the types of IDPs that can be modified.

FIG. 21 is a schematic illustration of an exemplary mission plan.

FIG. 29 is an illustration of an exemplary data structure for a record stored in a data store.

DETAILED DESCRIPTION

The present solution is described with reference to the attached figures. The figures are not drawn to scale and they are provided merely to illustrate the instant solution. Several aspects of the present solution are described below with reference to example applications for illustration. It should be understood that numerous specific details, relationships, and methods are set forth to provide a full understanding of the present solution. One having ordinary skill in the relevant art, however, will readily recognize that the present solution can be practiced without one or more of the specific details or with other methods. In other instances, well-known structures or operations are not shown in detail to avoid obscuring the present solution. The present solution is not limited by the illustrated ordering of acts or events, as some acts may occur in different orders and/or concurrently with other acts or events. Furthermore, not all illustrated acts or events are required to implement a methodology in accordance with the present solution.

It should also be appreciated that the terminology used herein is for the purpose of describing particular embodiments only and is not intended to be limiting of the present solution. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this solution belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Identity Agile Computer Network

Figure 1:
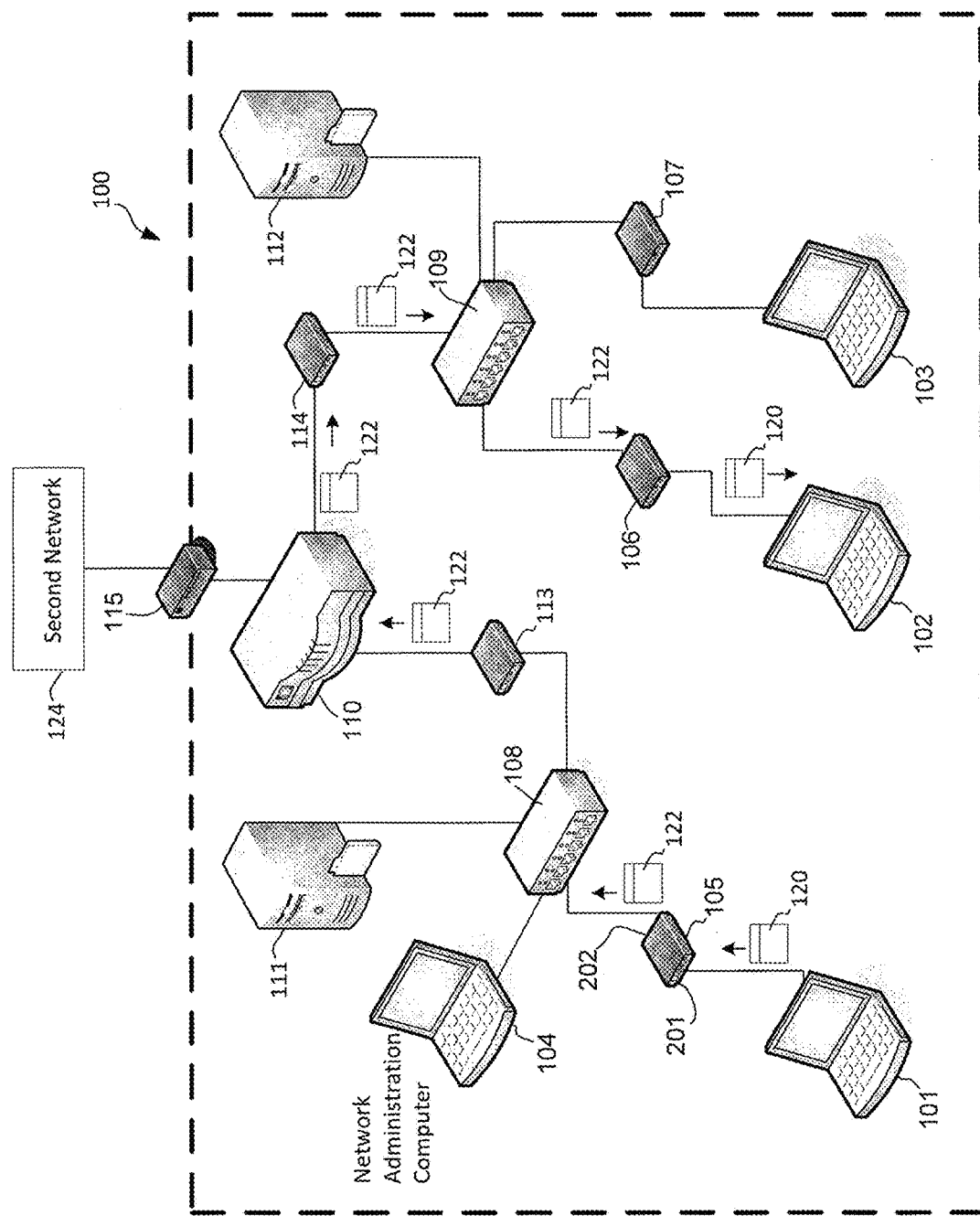
FIG. 1 is an example of a computer network.

Referring now to FIG. 1, there is shown a diagram of an exemplary network 100 which includes a plurality of computing devices. The computing devices can include client computers 101-103, Network Administration Computer ("NAC") 104, servers 111, 112, network hubs 108, 109, router 110, and a bridge 115. The client computers can be any type of computing device which might require network services, such as a conventional tablet, notebook, laptop or desktop computer. The router 110 can be a conventional routing device that forwards data packets between computer networks. The hubs 108, 109 are conventional hub devices (e.g. an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the network 100 can be wired, wireless or both, but shall be described herein as a wired network for simplicity and to avoid obscuring the present solution. The network will communicate data using a communication protocol. As is well known in the art, the communication protocol defines the formats and rules used for communicating data throughout the network. The network in FIG. 1 can use any communication protocol or combination of protocols which is now known or known in the future. For example, the network can use the well known Ethernet protocol suite for such communications. Alternatively, the network can make use of other protocols, such as the Internet Protocol Suite (often referred to as TCP/IP), SONET/SDH, or Asynchronous Transfer Mode ("ATM") communication protocols. In some scenarios, one or more of these communication protocols can be used in combination. Although one network topology is shown in FIG. 1, the present solution is not limited in this regard. Instead, any type of suitable network topology can be used, such as a bus network, a star network, a ring network or a mesh network.

The present solution generally concerns a method for communicating data in a computer network (e.g., in computer network 100), where data is communicated from a first computing device to a second computing device. Computing devices within the network are represented with multiple IDPs. The terms "identity parameters" and "IDPs", as used herein, can include items such as an IP address, a Media Access Control ("MAC") address, ports and so on. However, the present solution is not limited in this regard, and IDPs can also include a variety of other information which is useful for characterizing a network node. The various types of IDPs contemplated herein are discussed below in further detail. The present solution involves the use of Moving Target Technology ("MTT") to manipulate one or more of such IDPs for one or more computing devices within the network. This technique disguises communication patterns and network address of such computing devices. The manipulation of IDPs as described herein is generally performed in conjunction with data communications in the network, i.e. when data is to be communicated from a first computer in the network (e.g. client computer 101) to a second computer in the network (e.g., client computer 102). Accordingly, IDPs that are manipulated can include those of a source computing device (the device from which the data originated) and the destination computing device (the device to which the data is being sent). The set of IDPs that are communicated is referred to herein as an IDP set. This concept is illustrated in FIG. 1, which shows that an IDP set 120 is transmitted by client computer 101 as part of a data packet (not shown).

The process according to the inventive arrangements involves selectively modifying at a first location within the computer network, values contained in a data packet or datagram which specify one or more identify parameters of a source and/or destination computing device. The IDPs are modified in accordance with a mission plan. The location where such modification is performed will generally coincide with the location of one of the modules 105-107, 113, 114. Referring once again to FIG. 1, it can be observed that modules 105, 106, 107, 113, 114 are interposed in the network between the various computing devices which comprise nodes in such network. In these locations, the modules intercept data packet communications, perform the necessary manipulations of IDPs, and retransmit the data packets along a transmission path. In alternative scenarios, the modules 105, 106, 107, 113, 114 can perform a similar function, but can be integrated directly into one or more of the computing devices. For example, the modules could be integrated into client computers 101, 102, 103, servers 111, 112, hubs 108, 109 and/or within router 110.

Figure 2:
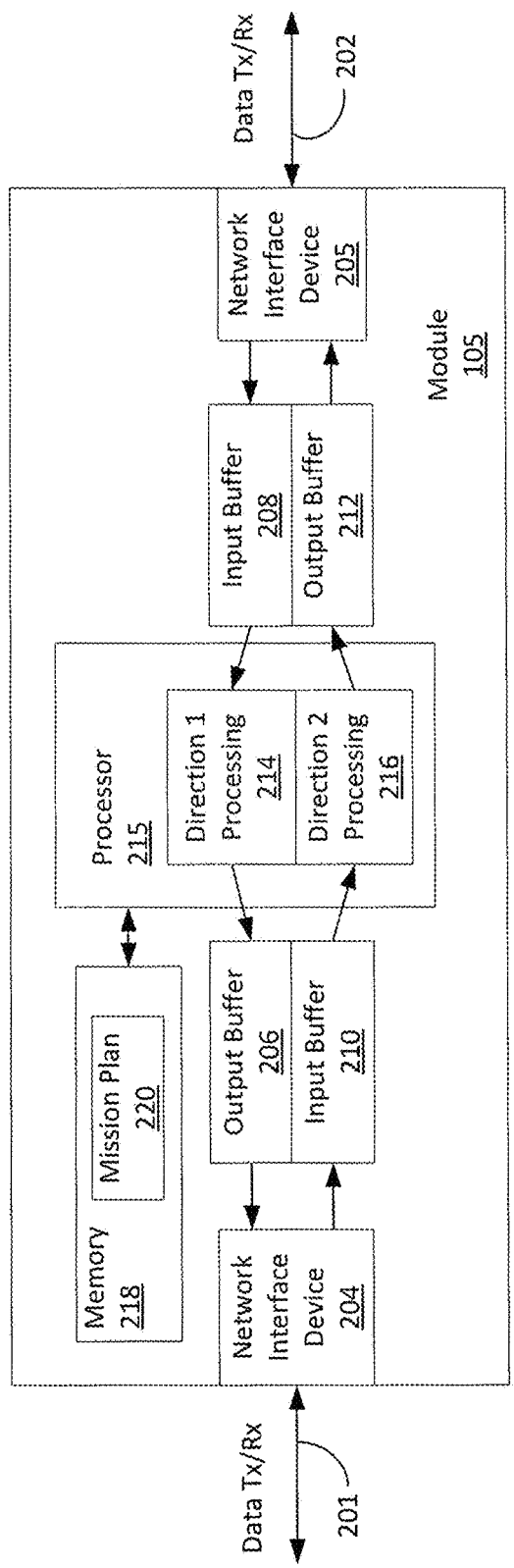
FIG. 2 is an example of a module that can be used in the present solution for performing certain manipulations of IDentity Parameters ("IDPs").

An example of a functional block diagram of a module 105 is shown in FIG. 2. Modules 106-107, 113, 114 can have a similar functional block diagram, but it should be understood that the present solution is not limited in this regard.

As shown in FIG. 2, the module 105 has at least two data ports 201, 202, each of which can correspond to a respective network interface device 204, 205. Data received at port 201 is processed at network interface device 204 and temporarily stored at an input buffer 210. The processor 215 accesses the input data packets contained in input buffer 210 and performs any necessary manipulation of IDPs as described herein. The modified data packets are passed to output buffer 212 and subsequently transmitted from port 202 using network interface device 205. Similarly, data received at port 202 is processed at network interface device 205 and temporarily stored at an input buffer 208. The processor 215 accesses the input data packets contained in input buffer 208 and performs any necessary manipulation of IDPs as described herein. The modified data packets are passed to output buffer 206 and subsequently transmitted from port 201 using network interface device 204. In each module, manipulation of IDPs is performed by processor 215 in accordance with a mission plan 220 stored in a memory 218.

It will be understood from FIG. 2 that a module is preferably configured so that it operates bi-directionally. In such scenarios, the module can implement different modification functions, depending on a source of a particular data packet. The dynamic modification function in each module can be specified in the mission plan in accordance with a source computing device of a particular data packet. Modules can determine a source of data packets by any suitable means. For example, a source address of a data packet can be used for this purpose.

At a selected module within the network 100, processor 215 will determine one or more false IDP values that are to be used in place of the true IDP values. The processor will transform one or more true IDP values to one or more false IDP values which are preferably specified by a pseudorandom function. Following this transformation, the module will forward the modified packet or datagram to the next node of the network along a transmission path. At subsequent points in the communication path, an adversary who is monitoring such network communications will observe false or incorrect information about the identity of computing devices communicating on the network.

In one scenario, the false IDPs that are specified by the pseudorandom function are varied in accordance with the occurrence of one or more trigger events. The trigger event causes the processor 215 to use the pseudorandom function to generate a new set of false IDP values into which the true IDPs are transformed. Accordingly, the trigger event serves as a basis for the dynamic variation of the false IDPs described herein. Trigger events are discussed in more detail below. However, it should be noted that trigger events for selecting a new set of false values for IDPs can be based on the passage of time and/or the occurrence of certain network events. Trigger events can also be initiated by a user command.

The transformation of IDPs described above provides one way to maneuver a computer network 100 for purposes of thwarting a cyber-attack. In some scenarios, the mission plan 220 implemented by processor 215 will also control certain other aspects of the manner in which computer network can maneuver. For example, the mission plan can specify that a dynamic selection of IDPs are manipulated. The dynamic selection can include a choice of which IDPs are selected for modification, and/or a number of such IDPs that are selected. This variable selection process provides an added dimension of uncertainty or variation which can be used to further thwart an adversary's effort to infiltrate or learn about a computer network 100. As an example of this technique, consider that during a first time period, a module can modify a destination IP address and a destination MAC address of each data packet. During a second time period the module could manipulate the source IP address and a source host name in each data packet. During a third period of time the module could manipulate a source port number and a source user name. Changes in the selection of IDPs can occur synchronously (all selected IDPs are changed at the same time). Alternatively, changes in the selection of IDPs can occur asynchronously (the group of selected IDPs changes incrementally as individual IDPs are added or removed from the group of selected IDPs).

A pseudorandom function is preferably used for determining the selection of identity values that are to be manipulated or transformed into false values. In other words, the module will transform only the IDPs selected by the pseudorandom function. In some scenarios, the selection of IDPs that are specified by the pseudorandom function is varied in accordance with the occurrence of a trigger event. The trigger event causes processor 215 use a pseudorandom function to generate a new selection of IDPs which are to be transformed into false IDPs. Accordingly, the trigger event serves as a basis for the dynamic variation of the selection of IDPs described herein. Notably, the values of the IDPs can also be varied in accordance with pseudorandom algorithm.

The modules are advantageously capable of also providing a third method of maneuvering the computer network for purposes of thwarting a cyber-attack. Specifically, the mission plan loaded in each module can dynamically vary the location within the network where the modification or transformation of the IDPs takes place. Consider that modification of IDPs in an IDP set 120 sent from client computer 101 to client computer 102, could occur in module 105. This condition is shown in FIG. 1, where the IDPs contained in IDP set 120 are manipulated in module 105 so that IDP set 120 is transformed to a new or modified IDP set 122. At least some of the IDPs in IDP set 122 are different as compared to the IDPs in IDP set 120. But the location where such transformation occurs is preferably also controlled by the mission plan. Accordingly, manipulation of IDP set 120 could, for example, sometimes occur at module 113 or 114, instead of at module 105. This ability to selectively vary the location where manipulation of IDPs occurs adds a further important dimension to the maneuvering capability of the computer network.

The dynamic variation in the location where IDPs are modified is facilitated by selectively controlling an operating state of each module. To that end, the operational states of each module preferably includes (1) an active state in which data is processed in accordance with a current mission plan, and (2) a by-pass state in which packets can flow through the module as if the module was not present. The location where the dynamic modification is performed is controlled by selectively causing certain modules to be in an active state and certain modules to be in a standby state. The location can be dynamically changed by dynamically varying the current state of the modules in a coordinated manner.

The mission plan can include predefined sequence for determining the locations within the computer network 100 where IDPs are to be manipulated. Locations where IDPs are to be manipulated will change in accordance with the sequence at times indicated by a trigger event. For example, the trigger event can cause a transition to a new location for manipulation or transformation of IDPs as described herein. Accordingly, the trigger event serves as a basis for the occurrence of a change in the location where IDPs are modified, and the predefined sequence determines where the new location will be.

From the foregoing, it will be appreciated that a data packet is modified at a module to include false IDPs. At some point within the computer network, it is necessary to restore the IDPs to their true values, so that the IDPs can be used to properly perform their intended function in accordance with the particular network protocol. Accordingly, the present solution also include dynamically modifying, at a second location (i.e., a second module), the assigned values for the IDPs in accordance with the mission plan. The modification at the second location essentially comprises an inverse of a process used at the first location to modify the IDPs. The module at the second location can thus restore or transform the false value IDPs back to their true values. In order to accomplish this action, the module at the second location must be able to determine at least (1) a selection of IDP value that are to be transformed, and (2) a correct transformation of the selected IDPs from false values to true values. In effect, this process involves an inverse of the pseudorandom process or processes used to determine the IDP selection and the changes effected to such IDP values. The inverse transformation step is illustrated in FIG. 1, where the IDP set 122 is received at module 106, and the IDP values in IDP set 122 are transformed or manipulated back to their original or true values. In this scenario, module 106 converts the IDP values back to those of IDP set 120.

Notably, a module must have some way of determining the proper transformation or manipulation to apply to each data communication it receives. In some scenarios, this determination is performed by examining at least a source address IDP contained within the received data communication. For example, the source address IDP can include an IP address of a source computing device. Once the true identity of the source computing device is known, the module consults the mission plan (or information derived from the mission plan) to determine what actions it needs to take. For example, these actions could include converting certain true IDP values to false IDP values. Alternatively, these changes could include converting false IDP values back to true IDP values.

Notably, there will be instances where the source address IDP information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address IDP value to a Look-Up-Table ("LUT") which lists all such false source address IDP values in use during a particular time. The LUT also includes a list of true source address IDP values that correspond to the false source address values. The LUT can be provided directly by the mission plan or can be generated by information contained within the mission plan. In either case, the identification of a true source address IDP value can be easily determined from the LUT. Once the true source address IDP has been determined, then the module which received the data communication can use this information to determine (based on the mission plan) what manipulations to the IDPs are needed.

Notably, the mission plan can also specify a variation in the second location where IDPs are restored to their true values. For example, assume that the IDPs are dynamically modified at a first location comprising module 105. The mission plan can specify that the restoration of the IDPs to their true values occurs at module 106 as described, but can alternatively specify that dynamic modification occur instead at module 113 or 114. In some scenarios, the location where such manipulations occur is dynamically determined by the mission plan in accordance with a predefined sequence. The predefined sequence can determine the sequence of locations or modules where the manipulation of IDPs will occur.

The transition involving dynamic modification at different locations preferably occurs in accordance with a trigger event. Accordingly, the predefined sequence determines the pattern or sequence of locations where data manipulations will occur, and the trigger event serves as a basis for causing the transition from one location to the next. Trigger events are discussed in more detail below; however, it should be noted that trigger events can be based on the passage of time, user control, and/or the occurrence of certain network events. Control over the choice of a second location (i.e., where IDPs are returned to their true values) can be effected in the same manner as described above with regard to the first location. Specifically, operating states of two or more modules can be toggled between an active state and a bypass state. Manipulation of IDPs will only occur in the module which has an active operating state. The module with a bypass operating state will simply pass data packets without modification.

Alternative methods can also be used for controlling the location where manipulation of IDPs will occur. For example, a network administrator can define in a mission plan several possible modules where IDPs can be converted from true values to false values. Upon the occurrence of a trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of IDPs should occur. Similarly, the network administrator can define in a mission plan several possible modules where dynamic manipulation returns the IDPs to their correct or true values. The selection of which module is used for this purpose can also be determined in accordance with a trigger time and a pseudorandom function as described herein. Other methods are also possible for determining the location or module where IDP manipulations are to occur. Accordingly, the present solution is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different position for the first and second locations within the network can have the effect of changing the number of nodes between the first and second locations. For example, in FIG. 1 the dynamic modification of IDPs is implemented in selected ones of the modules 105, 106, 107, 113, 114. The modules actually used to respectively implement the dynamic modification is determined as previously described. If module 105 is used for converting IDPs to false values and module 106 is used to convert them back to true values, then there are three network nodes 108, 110, 109 between modules 105 and 106. But if module 113 is used to convert to false values and module 114 is used to convert the IDPs back to true values, then there is only one network node 110 between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present solution, the manipulation of IDP values, the selection of IDPs, and the locations where these IDPs is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present solution, either can be used, and the two are considered equivalent. In some scenarios, the same pseudorandom process can be used for dynamically varying two or more of the maneuvering parameters. However, in some scenarios, two or more different pseudorandom processes are used so that two or more of these maneuvering parameters are modified independently of the others.

Trigger Events

As noted above, the dynamic changes to each of the maneuvering parameters is controlled by at least one trigger. A trigger is an event that causes a change to occur in relation to the dynamic modifications described herein. Stated differently, it can be said that the trigger causes the network to maneuver in a new way that is different than at a previous time (i.e., before the occurrence of the trigger). For example, during a first period of time, a mission plan can cause an IP address can be changed from value A to value B; but after the trigger event, the IP address can instead be changed from value A to value C. Similarly, during a first period of time a mission plan can cause an IP and MAC address to be modified; but after the trigger event, the mission plan can instead cause a MAC address and user name to be modified. As a third example, consider that during a first period of time a mission plan may cause IDPs to be changed when an ID set 120 arrives at module 105; but after the trigger event, can cause the IDPs to instead be changed when and ID set 120 arrives at module 113.

In its simplest form a trigger can be user activated or based on a simple timing scheme. In such scenarios, a clock time in each module could serve as a trigger. For example, a trigger event could be defined as occurring at the expiration of every sixty (60) second time interval. For such an arrangement, one or more of the maneuvering parameters could change every sixty (60) seconds in accordance with a predetermined clock time. In some scenarios, all of the maneuvering parameters can change concurrently so that the changes are synchronized. In a slightly more complex scenario, a time-based trigger arrangement can also be used, but a different unique trigger time interval can be selected for each maneuvering parameter. Thus, false IDP values could be changed at time interval X, a selection of IDPs would change in accordance with a time interval Y, and a location where such changes are performed would occur at time interval Z, where X, Y and Z are different values.

It will be appreciated that in scenarios which rely upon clock time as a trigger mechanism, it is advantageous to provide synchronization as between the clocks in various modules 105, 106, 107, 113, 114 to ensure that packets are not lost or dropped due to unrecognized IDPs. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

Other types of triggers are also possible with the present solution. For example, trigger events can be based on the occurrence or detection of potential network security threats. According to the present solution, a potential network security threat can be identified by a network security software suite. Alternatively, the potential network security threat can be identified upon the receipt of a data packet at a module 105, 106, 107, 113, 114 where the packet contains one or more IDPs that are inconsistent with the present state of network maneuvering. Regardless of the basis for identifying a network security threat, the existence of such threat can serve as a trigger event. A trigger event based on a network security threat can cause the same types of network maneuvers as those caused by the time based triggers described above. For example, false IDPs, the selection of IDPs and the locations of IDP transformations could remain stable (i.e., unchanged) except in the case were a network security threat was detected. Such an arrangement might be chosen, for example, in computer networks where frequent network maneuvering is not desirable.

Alternatively, time based trigger events can be combined with trigger events based on potential threats to network security. In such scenarios, a trigger event based on a security threat can have a different effect on the network maneuvering as compared to time based triggers. For example, a security threat-based trigger event can cause strategic or defensive changes in the network maneuvering so as to more aggressively counter such network security threat. The precise nature of such measures can depend on the nature of the threat, but can include a variety of responses. For example, different pseudorandom algorithms can be selected, and/or the number of IDPs selected for manipulation in each IDP set 120 can be increased. In systems that already make use of time based triggers, the response can also include increasing a frequency of network maneuvering. Thus, more frequent changes can be made with respect to (1) the false IDP values, (2) the selection of IDPs to be changed in each IDP set, and/or (3) the position of the first and second locations where IDPs are changed. Accordingly, the network maneuvering described herein provides a method for identifying potential network security threats and responding to same.

Mission Plans

According to the present solution, the network maneuvering described herein is controlled in accordance with a mission plan. A mission plan is a schema that defines and controls maneuverability within the context of a network and a security model. As such, the mission plan can be represented as a data file that is communicated from the NAC 104 to each module 105-107, 113-114. The mission plan is thereafter used by each module to control the manipulation of IDPs and coordinate its activities with the actions of the other modules in the network.

The mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

Figure 3:
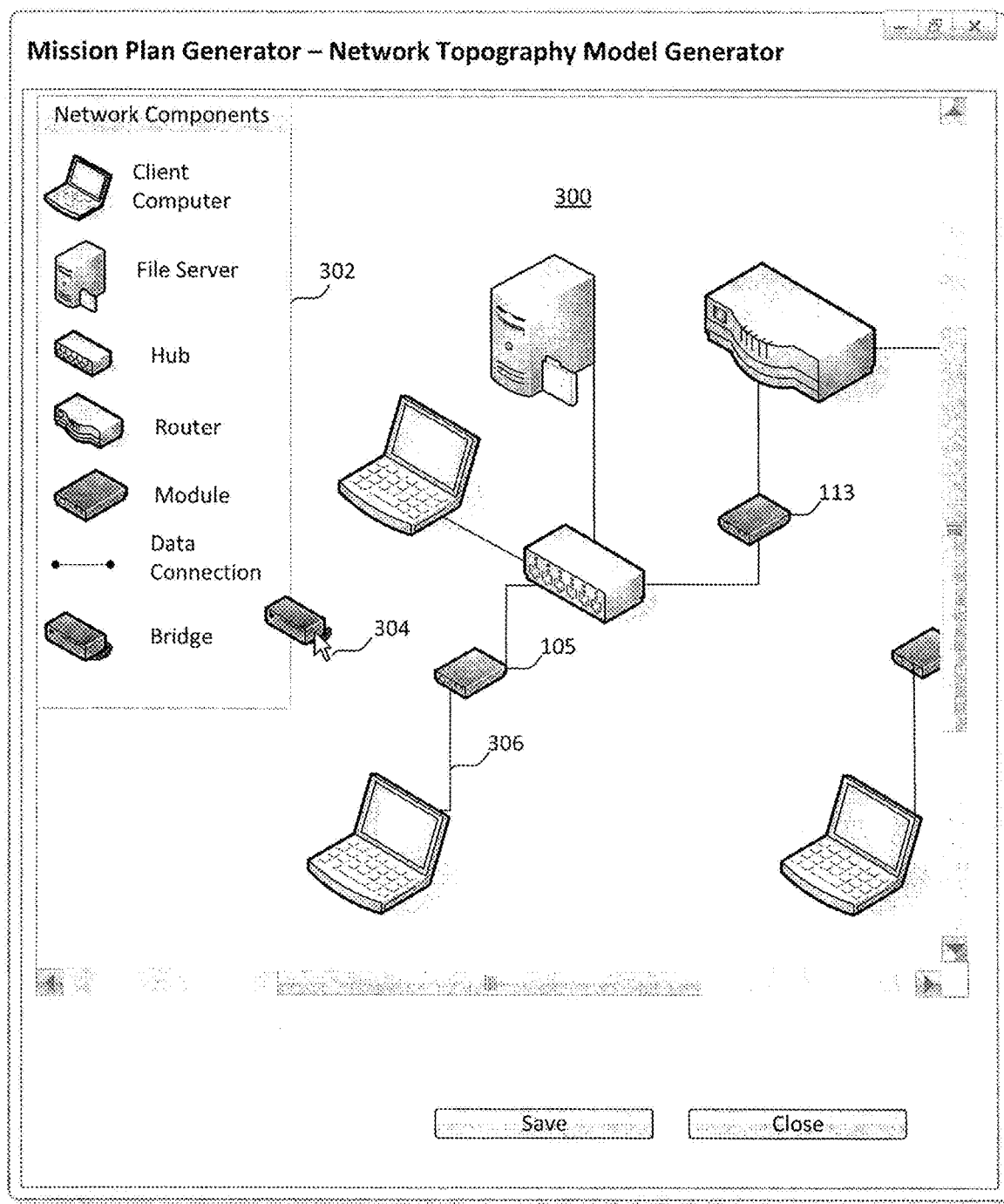
FIG. 3 is a drawing that is useful for understanding a tool that can be used to help characterize the network in FIG. 1.

The process of creating a mission plan can begin by modeling the network 100. The creation of the model is facilitated by a Network Control Software Application ("NCSA") executing on a computer or server at the network command center. For example, in the scenario shown in FIG. 1, the NCSA can execute on NAC 104. The network model preferably includes information which defines data connections and/or relationships between various computing devices included in the network 100. The NCSA will provide a suitable interface which facilitates entry of such relationship data. In some scenarios, the NCSA can facilitate entry of data into tables which can be used to define the mission plan. However, in some scenarios, a Graphic User Interface ("GUI") is used to facilitate this process. Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302 by using a cursor 304. The network administrator can also create data connections 306 between various network components 302. As part of this modeling process, the network administrator can provide network address information for the various network components, including the modules 105-107, 113, 114.

Figure 4:
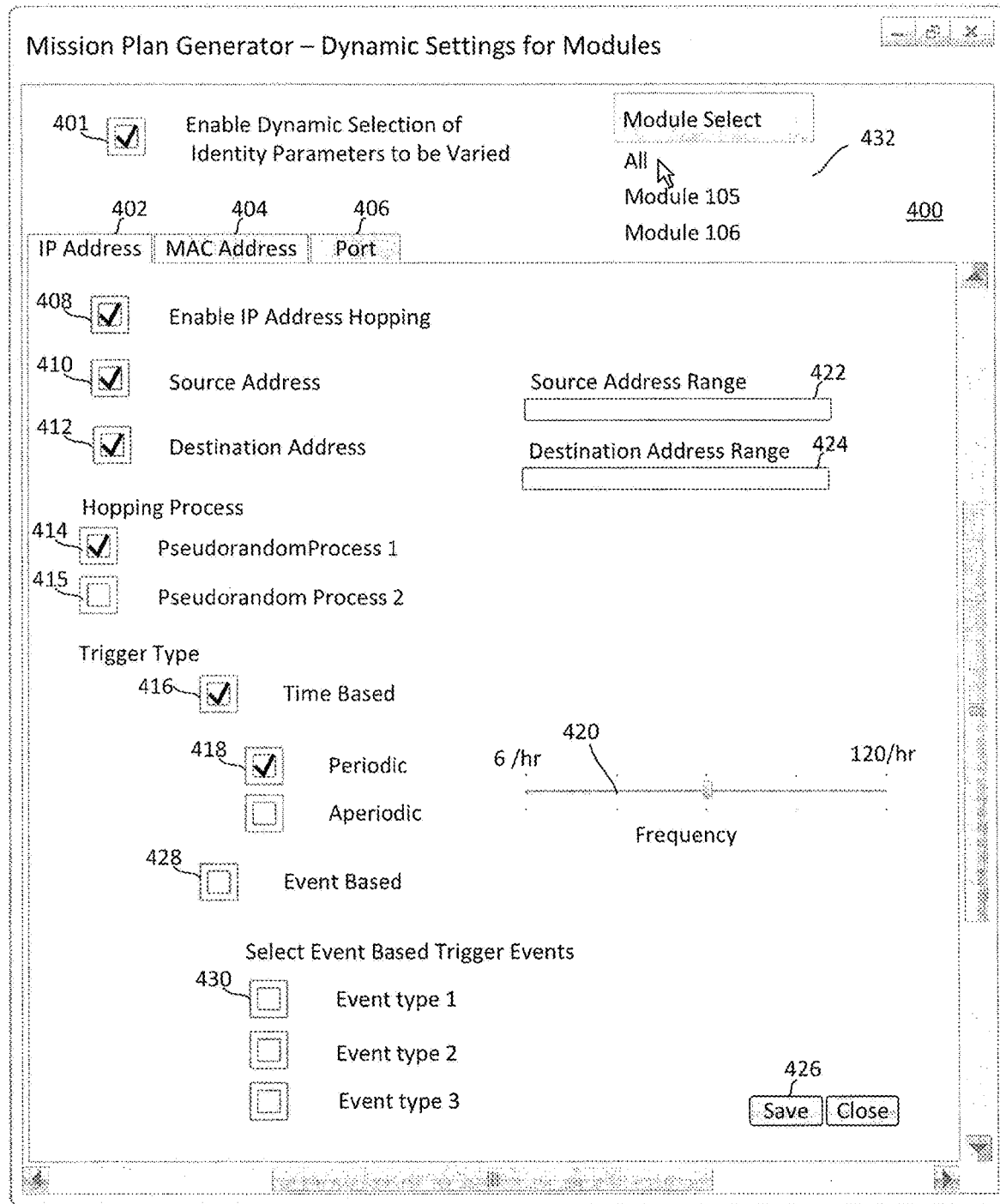
FIG. 4, is an example of a dialog box of a graphical user interface that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g., module 105) to which the settings in dialog box 400 are to be applied. Alternatively, the network administrator can use drop-down menu 432 to indicate that the settings in dialog box 400 are intended to be applied to all modules within the network (e.g., by selecting "All" in menu 432). The process can continue by specifying whether a fixed set of IDPs will always be modified in each of the modules, or whether the set of IDPs that are manipulated shall be dynamically varied. If the selection or set of IDPs that are to be manipulated in the modules is intended to be dynamically varied, the network administrator can mark check-box 401 to indicate that preference. If the check-box 401 is not marked, that will indicate that the set of IDPs to be varied is a fixed set that does not vary over time.

The dialog box 400 includes tabs 402, 404, 406 which allow a user to select the particular IDP that he wants to work with for purposes of creating a mission plan. For purposes of this disclosure, the dialog box 400 facilitates dynamic variation of only three (3) IDPs. Specifically, these include the IP address, MAC address and Port Address. More or fewer IDPs can be dynamically varied by providing additional tabs, but the three IDPs noted are sufficient to explain the inventive concepts. In FIG. 4, the user has selected the tab 402 to work with the IP Address type of IDP. Within tab 402, a variety of user interface controls 408-420 are provided for specifying the details relating to the dynamic variation of IP addresses within the selected module. More or fewer controls can be provided to facilitate the dynamic manipulation of the IP Address type, and the controls shown are merely provided to assist the reader in understanding the concept. In the example shown, the network administrator can enable dynamic variation of IP addresses by selecting (e.g., with a pointing device such as a mouse) the check-box 408 marked: Enable IP Address Hopping. Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the network 100.

Dialog box 400 also allows a network administrator to set the trigger type to be used for the dynamic variation of the IP Address IDP. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between six (6) trigger occurrences per hour (trigger every ten (10) minutes) and one hundred twenty (120) trigger occurrences per hour (trigger every thirty (30) seconds). In this example, selections are available for other types of triggers as well. For example, dialog box 402 includes check boxes 428, 430 by which the network administrator can select an event-based trigger. Several different specific event types can be selected to form the basis for such event-based triggers (e.g., Event type 1, Event type 2, etc.). These event types can include the detection of various potential computer network security threats. In FIG. 4, tabs 404 and 406 are similar to tab 402, but the controls therein are tailored to the dynamic variation of the MAC Address and Port value rather than the IP Address. Additional tabs could be provided for controlling the dynamic variation of other types of IDPs.

The mission plan can also specify a plan for dynamically varying the location where IDPs are modified. In some scenarios, this variable location feature is facilitated by controlling a sequence that defines when each module is in an active state or a bypass state. Accordingly, the mission plan advantageously includes some means of specifying this sequence. In some scenarios, this can involve the use of defined time intervals or time slots, which are separated by the occurrence of a trigger event.

Figure 5:
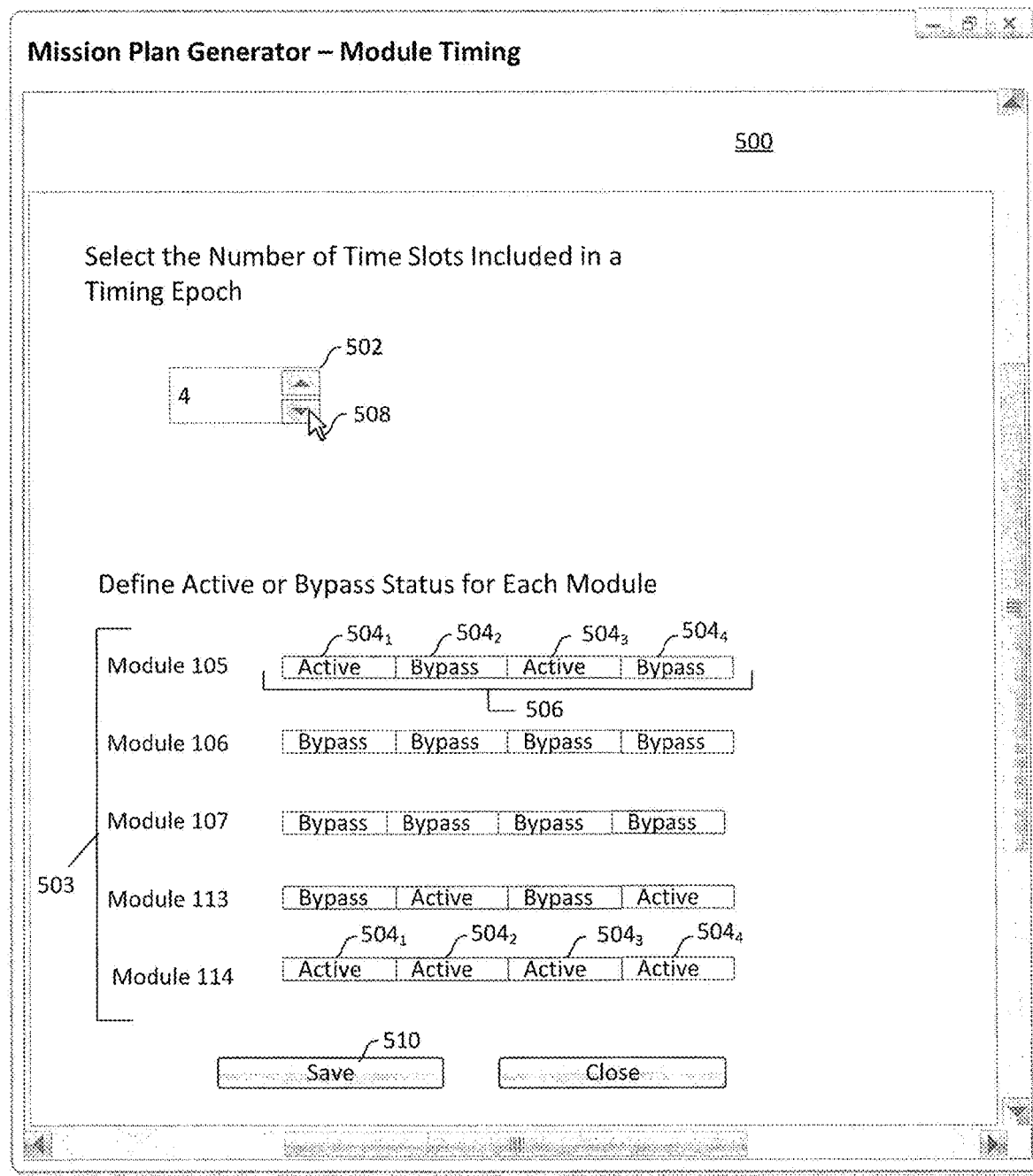
FIG. 5 is an example of a dialog box of a graphical user interface that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$ which are to be included within a time epoch 506. In the example illustrated, the network administrator has defined four (4) time slots per timing epoch. The dialog box 500 can also include a table 503 which includes all modules in the network 100. For each module listed, the table includes a graphical representation of available time slots $504_1$-$504_4$ for one timing epoch 506. Recall that dynamic control over the location where IDPs are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of IDPs occurs at a location associated with module 105 during time slots slot $504_1$ and $504_3$, but occurs instead at module 113 during time slots $504_2$, $504_4$.

In the example shown in FIG. 5, the network administrator has elected to have module 114 always operate in an active mode (i.e., module 114 is active during all time slots. Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of IDPs will be performed at these modules during any of the defined time slots. Once the module timing has been defined in dialog box 500, the network administrator can select the button 510 to store the changes as part of an updated mission plan. The mission plan can be saved in various formats. In some scenarios, the mission plan can be saved as a simple table or other type of defined data structure that can be used by each module for controlling the behavior of the module.

Mission Plan Generation Using a Behavior Model Library

Figure 14:
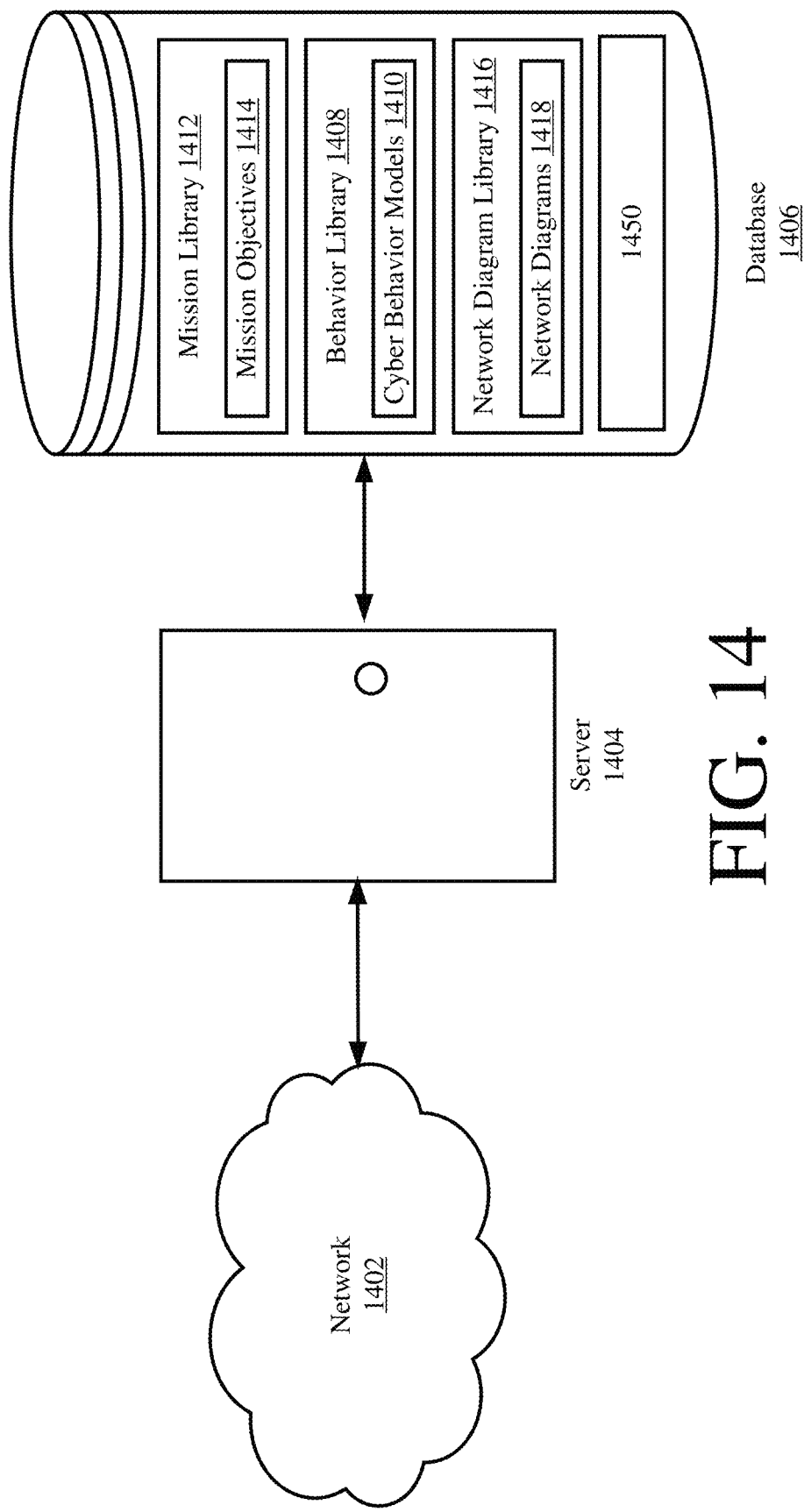
FIG. 14 is a schematic illustration of an exemplary system employing cyber behavior models to define and manage mission models.

In order to effectively manage dynamic networks, one must have extensive subject matter expertise to define strategy, behavior and maneuver schemes which are to be implemented via mission plans. The present solution provides a means to decrease the complexity of mission plan creation so that mission plans can be created by those who do not have the previously mentioned extensive subject matter expertise. In this regard, a mission library 1412, a behavior library 1408 and a network diagram library 1416 are employed as shown in FIG. 14. These libraries 1408, 1412, 1416 are accessible via a server 1404 and a network 1402. The network 1402 can be the same or different network in which IDP maneuverability is employed.

Figure 15:
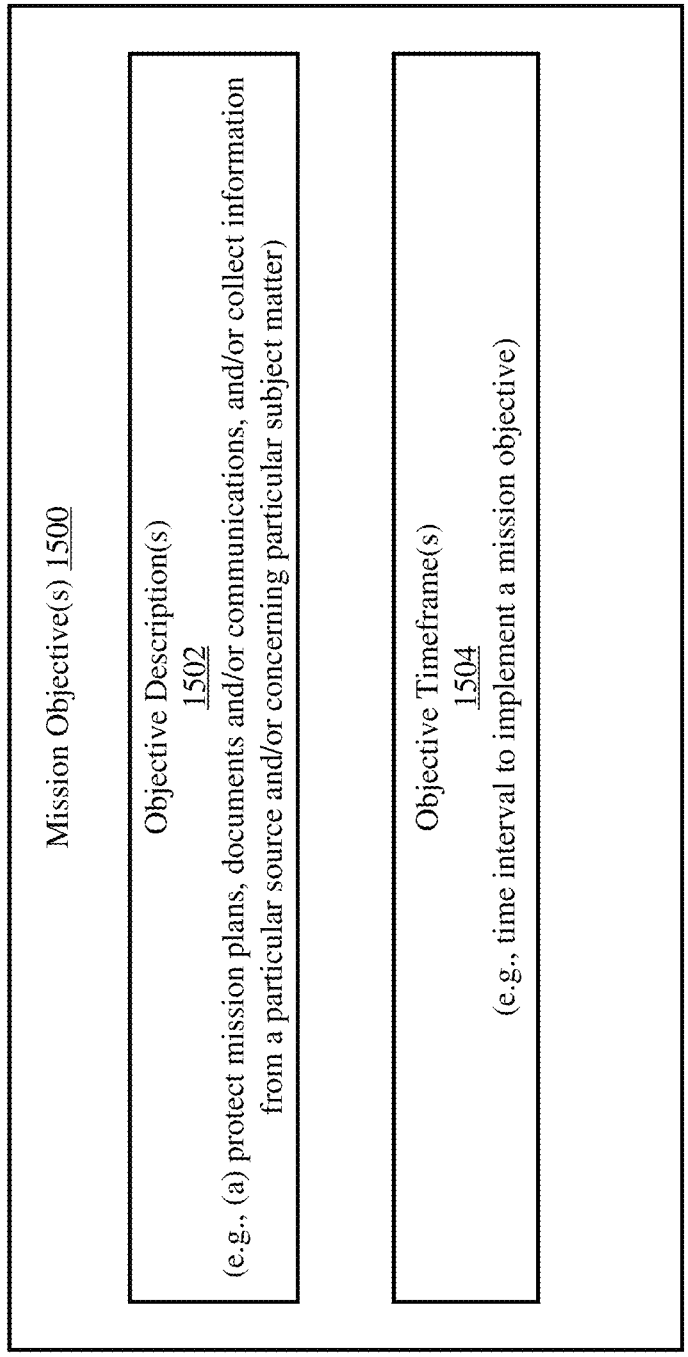
FIG. 15 is a schematic illustration of an exemplary mission objective.

The mission library 1412 comprises a plurality of mission objectives 1414. A mission objective is an end toward which effort and action are directed or coordinated. There can be a number of mission objectives in order to achieve a mission. An exemplary architecture for a mission objective is provided in FIG. 15. As shown in FIG. 15, the mission objective comprises at least one objective description 1502 and at least one objective timeframe 1504. An objective description describes the mission objective. For example, an objective description 1502 includes, but is not limited to, protect a mission model, protect certain documents (e.g., military or corporate strategy documents), protect certain communications, collect information from a particular source, and/or collect information concerning a particular subject matter. An objective timeframe 1504 includes at least one-time interval to implement at least one mission objective.

The behavior library 1408 comprises a plurality of Cyber Behavior Models ("CBMs") 1410. The CBMs 1410 are generally used to drive the definition and management of mission plans. The CBMs 1410 can be defined and composed based upon behavior models derived from and within different communities. For example, the CBMs 1410 can be defined and composed based on maneuver theory, psychology, animal behavior, military theory, past military operations, music construction, etc. The present solution is not limited to the particulars of this example.

The behavior library 1408 allows for: the automation of CBM definitions; the use of a common language and models for deriving maneuver scheme definitions; the incorporation of lessons learned from previous missions to develop new maneuver schemes with improved resiliency; and the reuse of CBMs so that the dynamic network management is achieved efficiently and effectively.

The network diagram library 1416 includes information specifying a hardware and/or software architecture of a network. The hardware architecture can be constructed out of physical hardware and/or virtualized hardware. In this regard, the network diagram library 1416 comprises information indicating network node unique identifiers, network node types, operational capabilities of the network nodes, and/or wired connections between the network nodes. In some scenarios, the network diagram library also includes information organizing the network nodes into talkgroups or communities and/or information indicating security levels associated with the network nodes.

Figure 16:
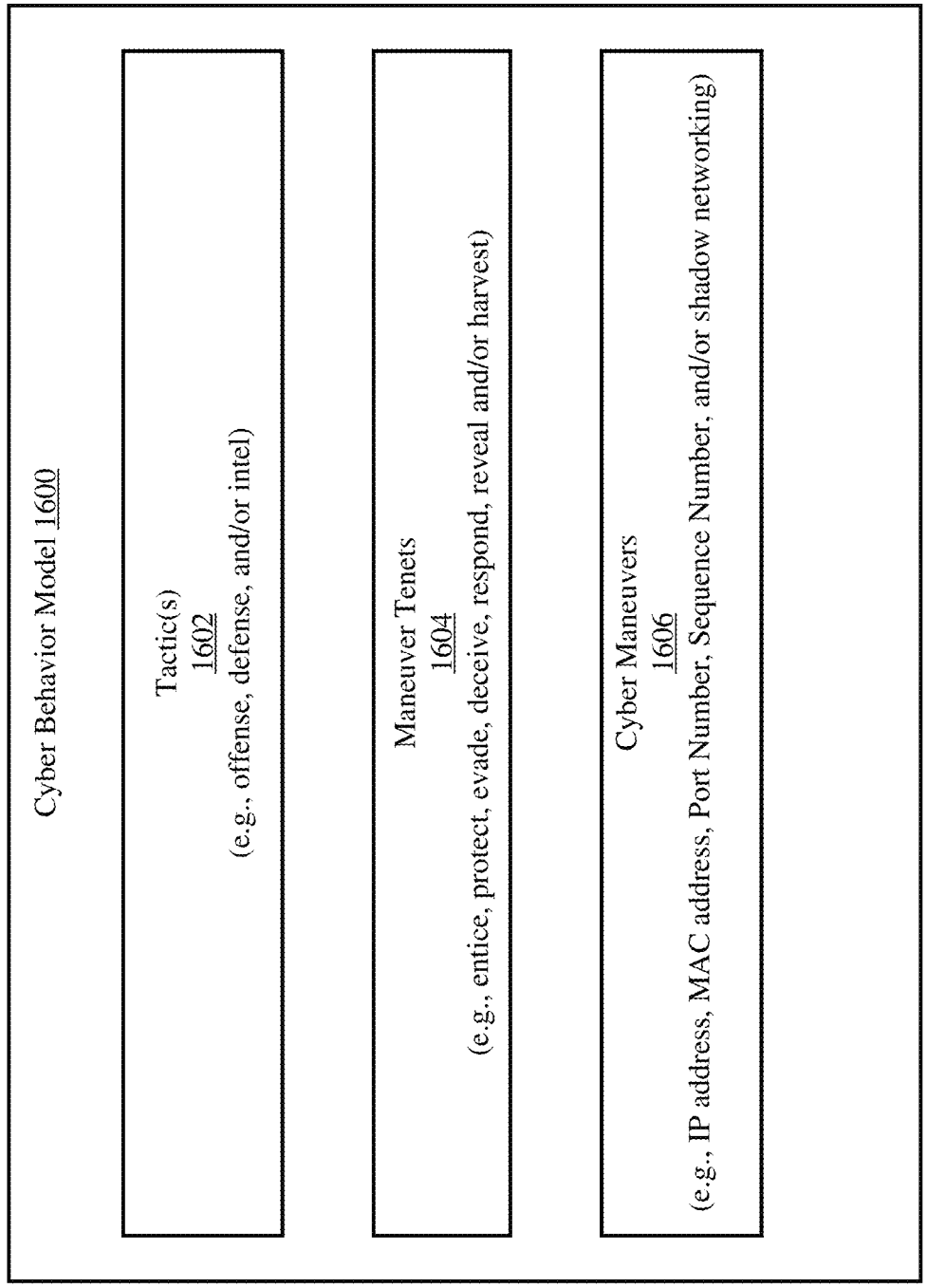
FIG. 16 is a schematic illustration of an exemplary cyber behavior model.

A schematic illustration of an exemplary CBM 1600 is provided in FIG. 16. As shown in FIG. 15, the CBM 1600 comprises information defining tactic(s) 1602, maneuver tenet(s) 1604, and cyber maneuvers 1606. A tactic 1602 is a strategy planned to achieve a specific end (or mission objective). For example, a tactic is offense, defense or intel (or intelligence gathering). An offensive tactic is an operation that seeks through a cyber-attack to gain information and/or disrupt operations of a given computer system (e.g., a computer system of an enemy). A defensive tactic is an operation designed to repel cyber-attacks on a given computer system, while also protecting the computer system from cyber-attacks. An intel tactic is an operation to identify and collect (or harvest) information that can provide guidance and direction to achieve the mission objective 1414.

A maneuver tenet 1604 is a principle of network maneuverability for implementing a specific offensive, defensive or intelligence collection strategy (or tactic). A maneuver tenet 1606 defines network operations for enticing a cyber-attack, protecting from a cyber-attack, evading a cyber-attack, deceiving cyber-attackers, responding to a cyber-attack, revealing a cyber-attack and/or harvesting a cyber-attack. The terms "entice", "protect", "evade", "deceive", "respond", "reveal" and "harvest" are all defined below.

The phrase "entice" means to attract or tempt (like bait) by offering pleasure or advantage. Thus, the maneuver tenet for enticing a cyber-attack comprises items or objects that can be offered as enticement. The items or objects can be dynamic. In this case, a behavior model is provided that describes the dynamic nature of the items or objects. A time period may also be defined during which the items or objects will be offered as bait. The item or object can include, but is not limited to, a value stored in memory at a location which is referenced by an identifier.

The phrase "protect" means to keep safe from harm or injury. In cyber parlance, it means to keep a computer safe from an attack vector reaching the computer, operating in its memory, reading its data, etc. Protection contains the elements of: {invisibility; blocking; fortifying; extinguishing}. Thus, the maneuver tenet for protecting from a cyber-attack comprises information identifying who should be allowed to communicate with each other in accordance with a given strategy. This information can identify people, organizations, entities and/or network devices that are to implement a strategy and/or have access to information associated with the strategy. For example, a maneuver tenant includes identifiers for network devices that comprise sensitive information and/or people that have the appropriate security level to access to the sensitive information. If any of the protection elements are dynamic in nature, a behavior model is provided defining the dynamic nature thereof.

The word "evade" means to escape or avoid (especially by being clever or tricky). A maneuver tenant for evading a cyber-attack has the following elements: an associated movement or assignment of two possibilities (e.g., a target moves or changes from A to B and/or the attacker misaligns or misinterprets); a target; an attacker; a behavior model defining the kind of movement; a velocity of movement; and a time period during which movement will exist. As such, this maneuver tenant comprises information associated with how often a network maneuver is happening, how big a maneuver space is that certain information can move within, and/or what is the overall networking address space that computers are allowed to maneuver within. For example, a maneuver tenant includes information identifying at least one IDP for which false values are to be employed, a rate at which the IDP value should be changed, and/or timeslots of a frame in which the IDP value should be changed.

The word "deceive" means to cause someone or a system to believe something is not true. Something fake can be substituted for something real. Any item in the communication model can be substituted by a fake item in the communication model (real physical equipment or virtual equipment). If any of the objects are interposed in a dynamic fashion, a behavior model is provided that describes the dynamic fashion. For example, a false IP address can be substituted in place of a real IP address. A maneuver tenant for deceiving a source of a cyber-attack has the following elements: a transformation function f(x); a velocity of transformation; and a time or timeframe associated that the transformative process will operate across. Accordingly, this maneuver tenant comprises information that identifies a deception network device associated with each false IDP value that is intended to cause a cyber-attacker and/or malicious software to believe that (s)he or it has gained access to the actual network equipment of interest (e.g., the network devices implementing network maneuverability). The deception network device can be configured to capture information indicating actions of cyber-attackers and/or information useful for tracing the hackers behind a cyber-attack.

The word "respond" means to do an action in reply to a previous action. A maneuver tenant for responding to a cyber-attack has the following elements: an action; a reply to the action; a velocity; a period of sustainment for the action to exist; and a behavior model (or set of behavior models) defining both actions. Therefore, this maneuver tenant comprises at least one rule specifying at least one action that should be taken when a given action occurs (e.g., a malicious attack is detected). The action can include, but is not limited to, dropping a received packet (which could be the result of or including an incorrect identity parameter value for a given timeslot), forwarding the received packet to an intrusion analysis tool or honeypot analysis tool, logging information associated with the received packet, determining a source of the received packet, sending a response to the source of the received packet, notifying an appropriate authority, and/or issuing an alarm.

The word "reveal" means to cause an action, location or intent to become visible and noticed. A maneuver tenet for reveal includes items and/or objects. There is a behavior done by an object to cause an opponent (opposing object) to make visible (reveal) their: location; intent and associated behavior; strength; and/or behavior or object that the opponent is triggering on. The originating (triggering)

behavior(s) and object(s) can be dynamic as well as the opponent's behavior(s) and/or object(s). A behavior model is provided that described the dynamic nature of the behaviors and objects.

The word "harvest" means to identify a set of objects and collect those objects. A maneuver tenet for harvest includes items and/or objects that can be identified and collected. An associative relationship exists between the identification algorithm and the collection function of the objects. The associative relationship can be a set of mathematical functions (e.g., collect those items "=" $x_j$, collect those items !=to $x_j$, etc.). The associative relationship can be a relationship to any of the {objectives; tactics; tenets; behavior models; members of a set of maneuvers; network drawings; time frames}.

The cyber maneuvers 1606 comprise information specifying IDPs and how those IDPs are to be changed during operation of the system, as well as particulars of shadow networking techniques. In some scenarios, the cyber maneuvers 1606 can include, but are not limited to, an IP address, a MAC address, a port number, a sequence number, and/or shadow networking parameters. Shadow networking techniques are described in U.S. Pat. No. 9,075,992 to Smith et al. ("the '992 application), which is incorporated herein by reference. Any known or to be known shadow networking technique can be used herein without limitation. In some scenarios, shadow networking is used to identify, deter and/or delay malicious attacks being waged on a computer network. This is achieved by: using two (2) possible values for an IDP (e.g., an IP address) in communications to and from a network node in different timeslots of a plurality of timeslots of a time frame; comparing a value of the IDP contained in a received packet with the possible values specified for the IDP; and determining that a cyber-attack is occurring when the received packet's IDP value does not match the IDP value specified for the current timeslot.

Figure 17:
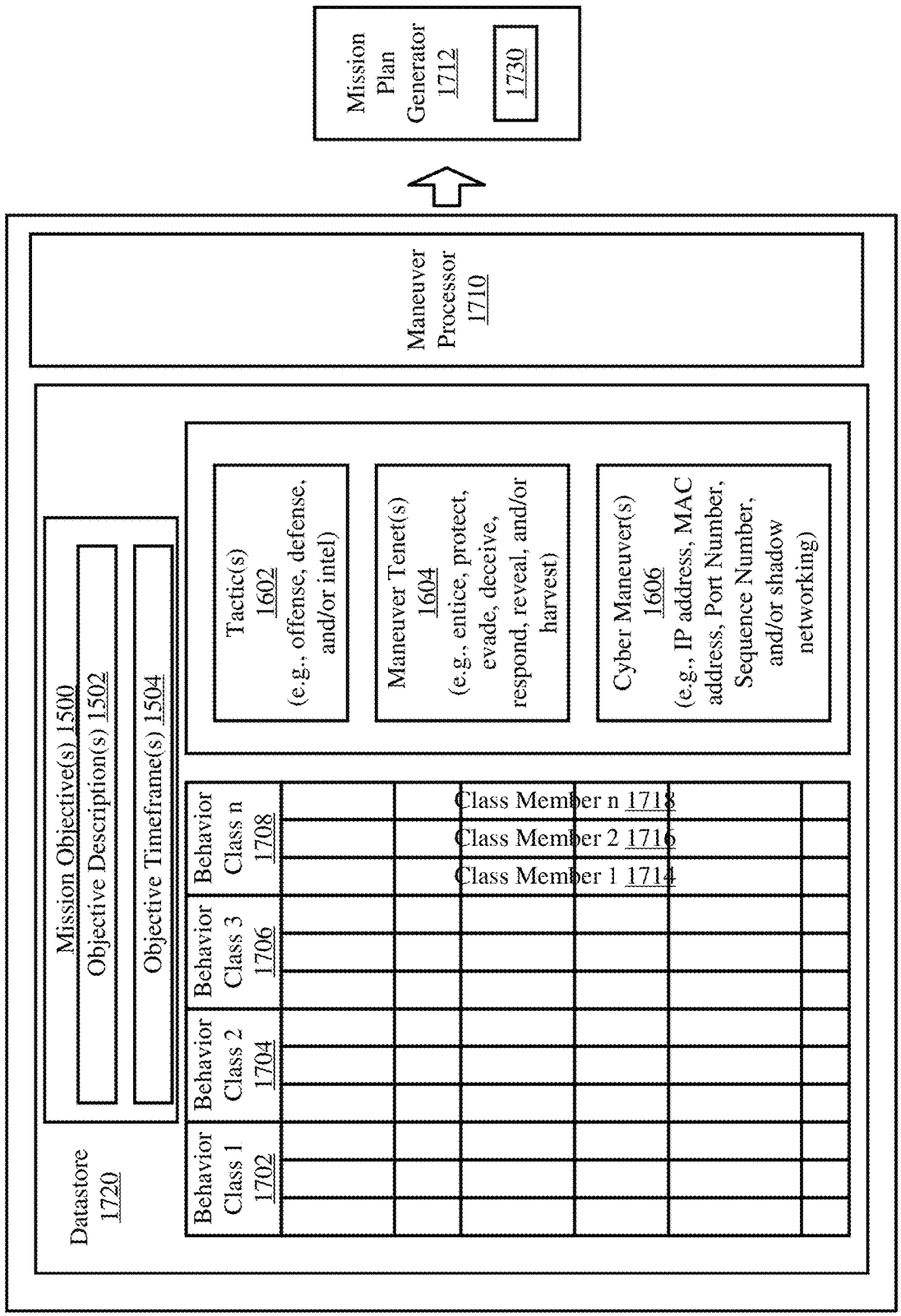
FIG. 17 is a schematic illustration that is useful for understanding how a mission plan is generated based on at least one cyber behavior model.

FIG. 17 provides a schematic illustration that is useful for understanding how mission plans are generated using CBMs (such as CBM 1600 of FIG. 16). During operation, a user is presented a graphical means for selecting CBM criteria. The graphical means can be presented via a computing device. An exemplary computing device 2200 is shown in FIG. 2, which will be discussed in detail below. The CBM criteria includes, but is not limited to, at least one mission objective 1500, at least one object description 1502, at least one objective time frame 1504, at least one tactic 1602, at least one maneuver tenet 1604, and at least one cyber maneuver 1606. Each of the listed types of CBM criteria is discussed above.

Figure 18:
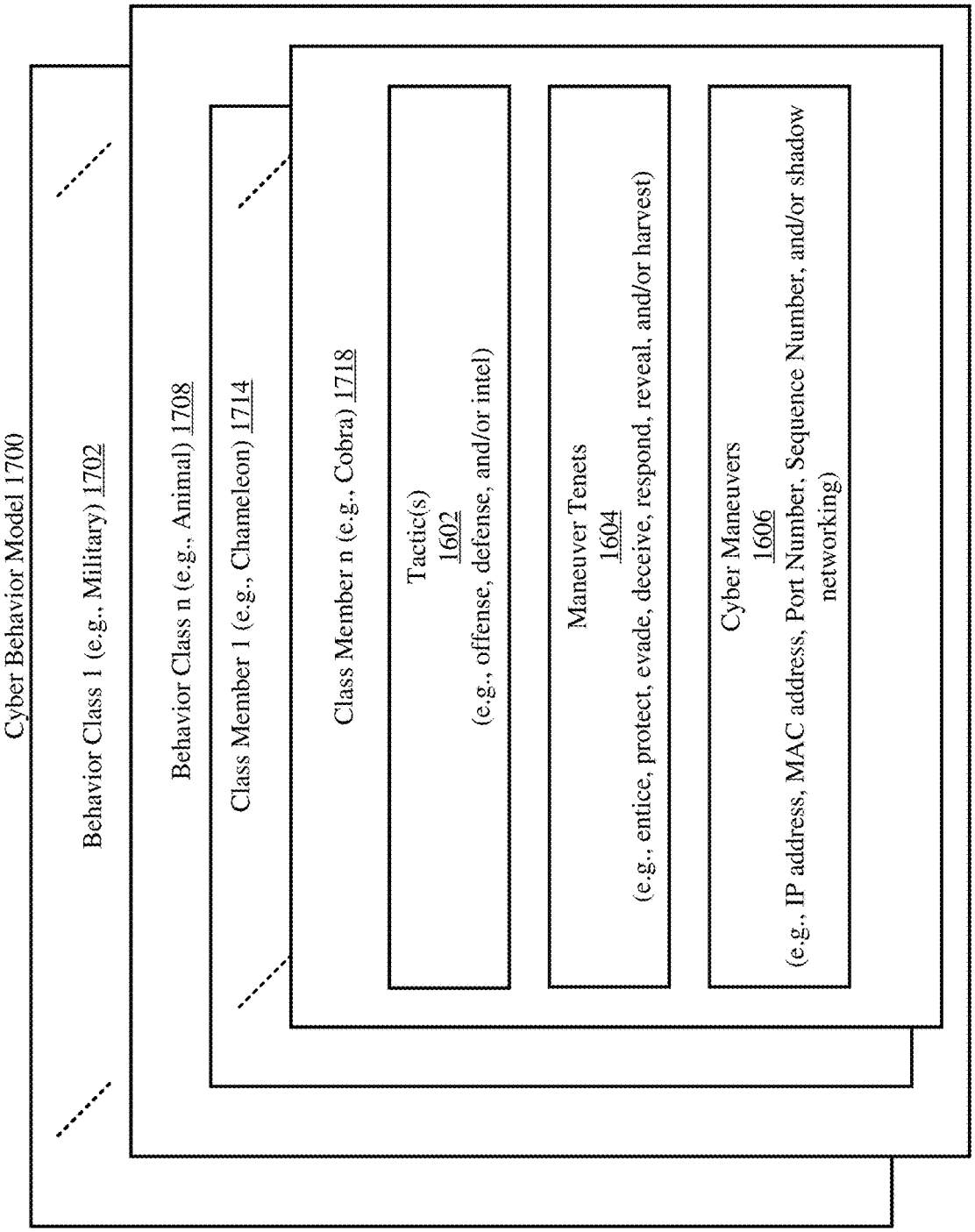
FIG. 18 is a schematic illustration that is useful for understanding how cyber behavior models are stored in a datastore.

Based on the user-selection, information associated with one or more CBMs is presented to the user. This information comprises identifiers for a plurality of behavior classes 1702, 1704, 1706 and 1708. A behavior class is a class of maneuverability behavior for a network. The behavior classes include, but are not limited to, animal, military, and/or music. In each class, there are a plurality of member sub-classes 1714-1718 as shown in FIGS. 17-18. For example, the animal class includes a chameleon class member and a cobra class member. Each member sub-class 1714-1718 is defined by or associated with at least one tactic 1602, maneuver tenet 1604 and cyber maneuver 1606.

In addition to the behavior class information, a graphical means is also presented which allows the user to define time period(s) at which one or more CBMs, behavior classes and/or member sub-classes is(are) to operate. These time periods are used to define a time schedule for implementation of the CBM(s). Once the time schedule is generated, maneuver processing is performed by a maneuver processor 1710 (e.g., implemented as a CPU 2204 and/or hardware entity 2210 of a computing device 2200 shown in FIG. 22) to obtain information for the CBM(s) particulars. This information is then used by a mission plan generator 1712 (e.g., implemented as a CPU 2204 and/or hardware entity of 2210 of a computing device 2200 shown in FIG. 22) to generate or obtain a mission plan as shown by functional block 1712.

In some scenarios, the mission plan can be generated automatically or obtained by selecting at least one mission plan from a plurality of pre-generated mission plans based on the user defined criteria. In other scenarios, the bounds of the mission plan are generated based on the user defined criteria. A user then uses the defined bounds to manually generate the mission plan. For example, the bounds define a template mission plan that can be customized by the user.

In some scenarios, the pre-generated mission plans (e.g., mission plans 1450 of FIG. 14) are stored in a data store (e.g., database 1406 of FIG. 14). The pre-generated mission models are stored so as to be associated with respective CBMs. This association can be achieved using a hierarchy structure or other relation specifying data organization (e.g., tables). Each CBM can have one or more pre-generated mission models associated therewith. Additionally, two CBMs can have one or more of the same pre-generated mission models associated therewith.

An exemplary mission plan 2100 is shown in FIG. 21. The mission plan 2100 includes at least one mission model 2102 with a plurality of possible values for a variable identity parameter (e.g., an IP address). The plurality of possible values is generated or obtained by the mission plan generator 1712. In this regard, the mission plan generator 1712 comprises an IDP false value generator 1730 employing chaotic, random and/or pseudo-random algorithms or hand-picked algorithms which can be used to derive the possible values or select the possible values from a LUT. A seed value for the algorithms can include, but are not limited to, an identifier for a particular CBM or mission model. The mission model(s) is(are) then used to define the mission plan 2100.

Figure 19:
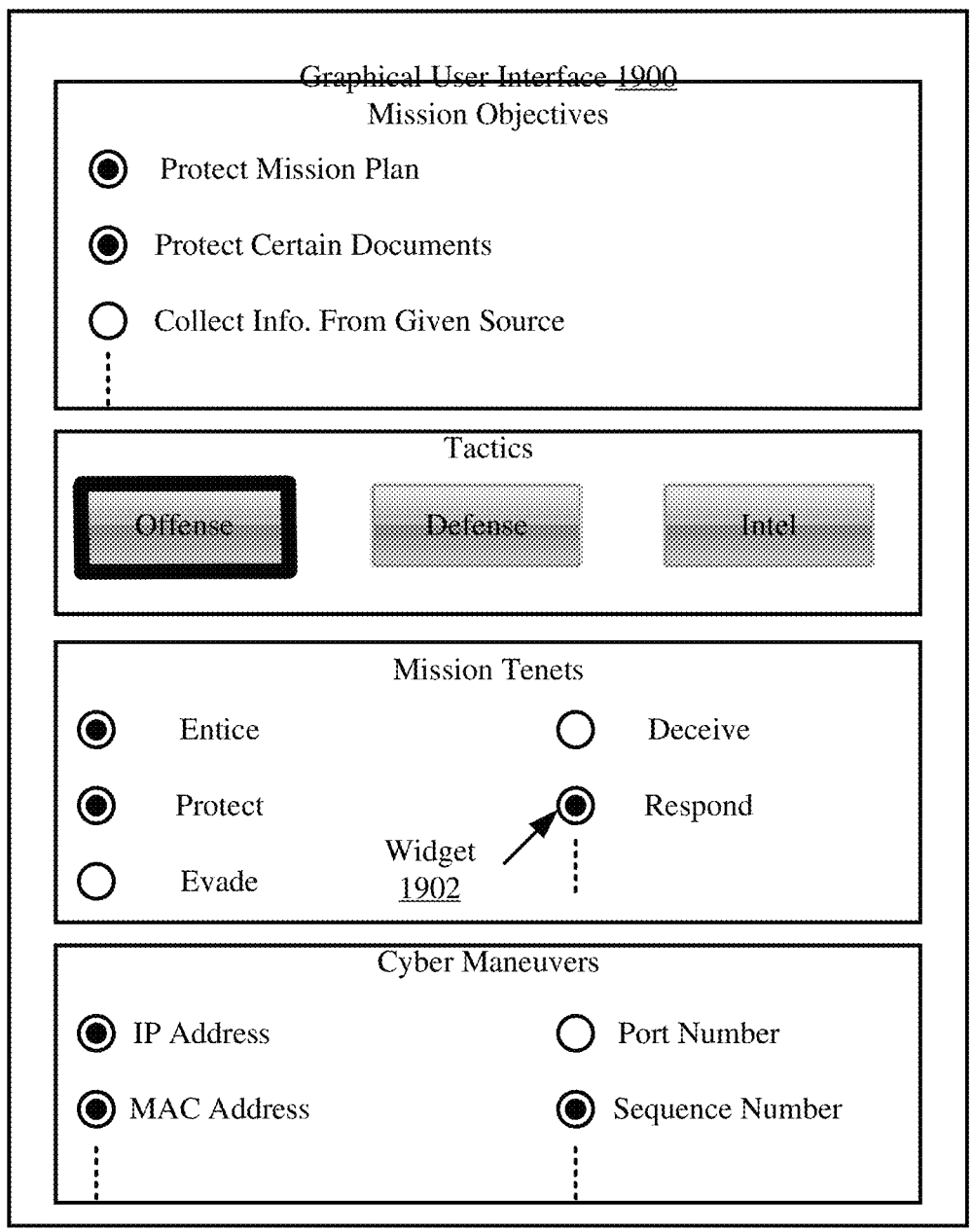
FIG. 19 is a schematic illustration of an exemplary graphical user interface for selecting mission objectives, tactics, tenents and cyber maneuvers.
Figure 20:
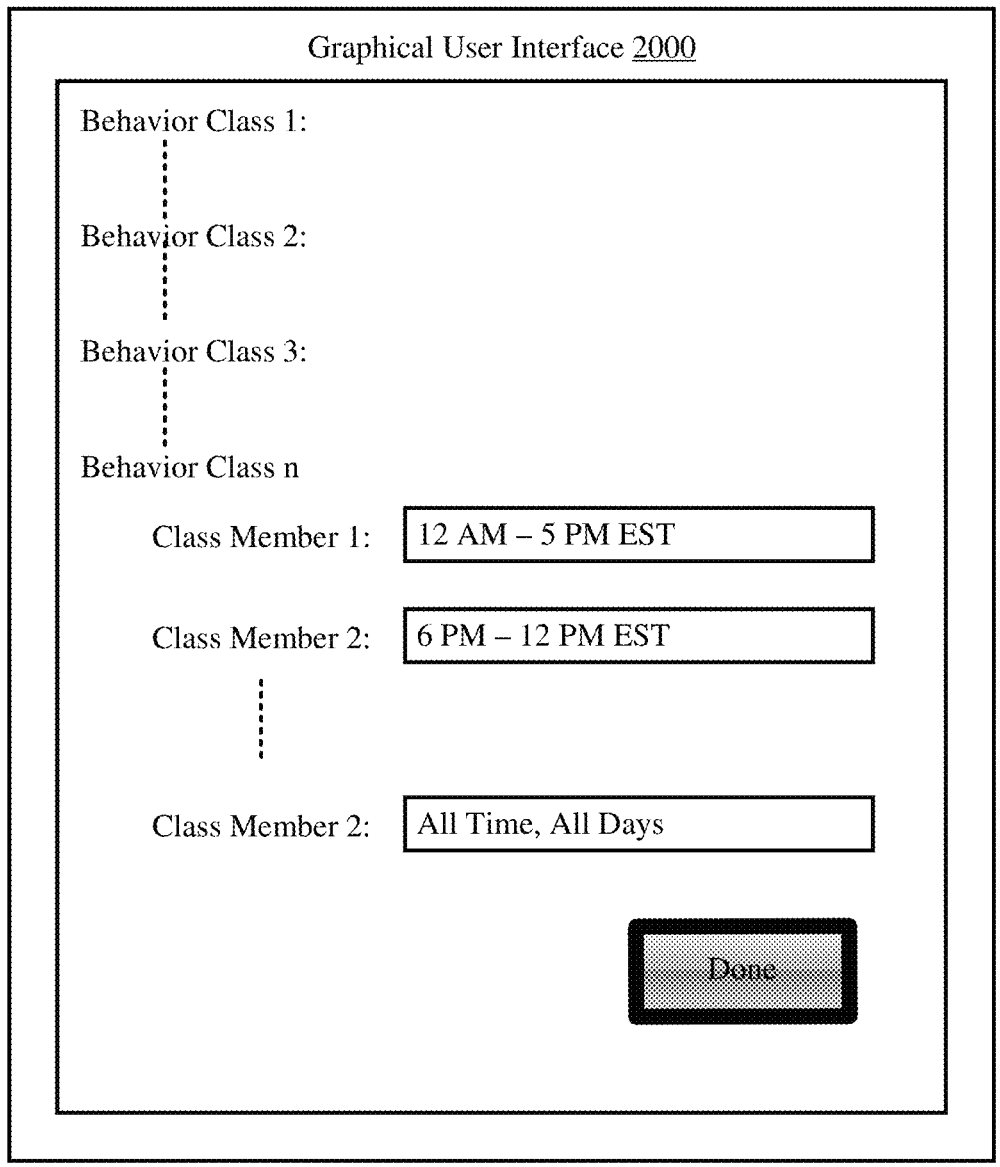
FIG. 20 is a schematic illustration of an exemplary graphical user interface that is useful for specifying times at which certain behavior classes should be employed.

The mission plan generation can be achieved using one or more GUIs. Illustrations of exemplary GUIs 1900, 2000 are provided in FIGS. 19-20. GUIs 1900, 2000 are designed to allow a user-software interaction for selecting CBM criteria. The GUI 1900 comprises a plurality of widgets 1902 which facilitate user-software interactions for selecting mission objectives, tactics, mission tenets and/or cyber maneuvers. The GUI 2000 comprises a plurality of text boxes and/or other graphic elements that allow a user to specify times at which all or portions of a CBM are to be employed for purposes of network maneuverability. The widgets and other graphical elements can include, but are not limited to, virtual buttons, check boxes, drop down menus (not shown), scroll bars (not shown), and/or any other known or to be known graphical control element.

Figure 22:
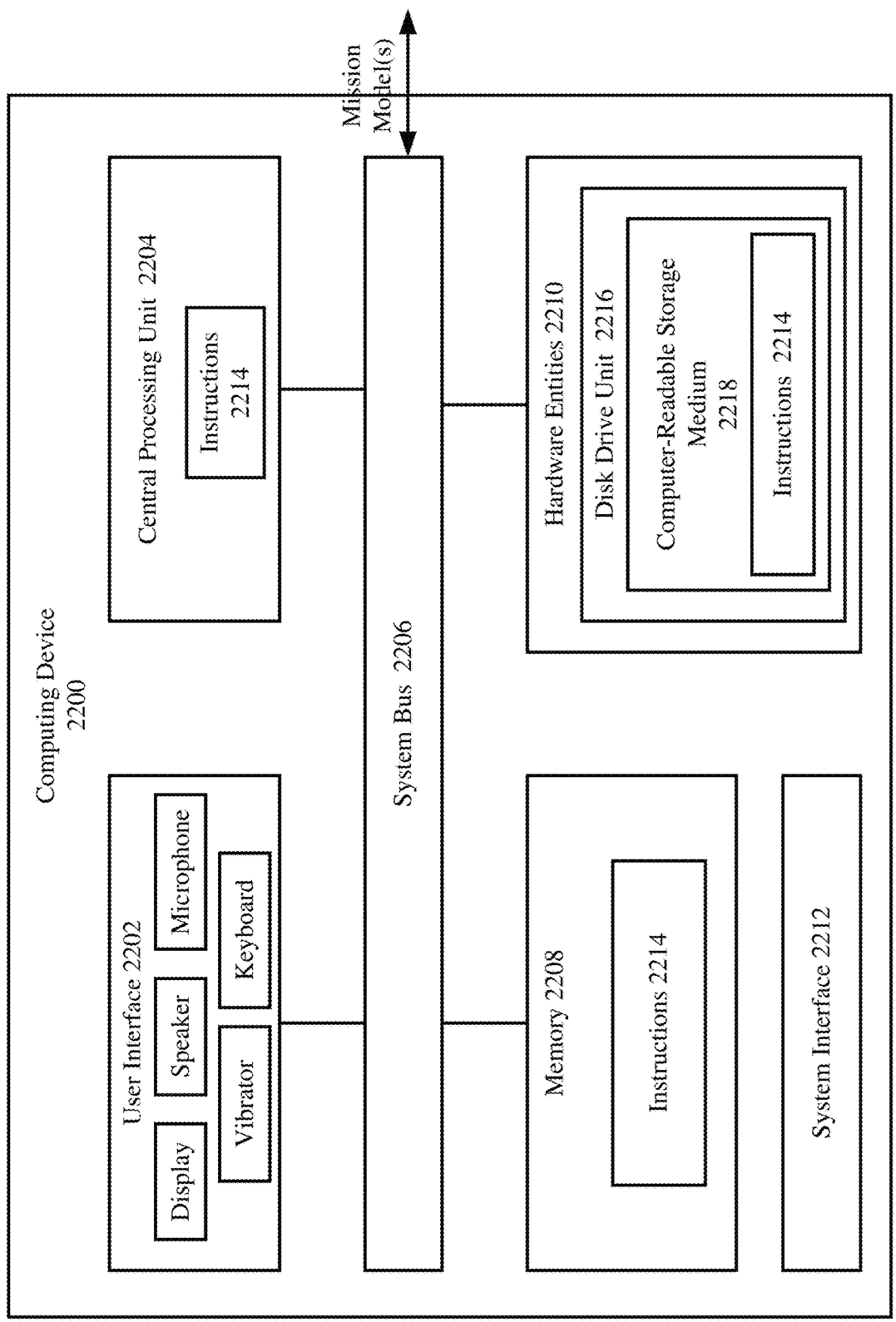
FIG. 22 is an illustration of an exemplary computer device.

Referring now to FIG. 22, there is provided a schematic illustration an exemplary computing device 2200. The computing device can include, but is not limited to, a personal computer, a laptop computer, a desktop computer and/or a server. The computing device 2200 is generally configured to perform operations for providing dynamic computer networks in which behavior models drive cyber mission models. As such, the computing system 2200 comprises a plurality of components 2202-2212. The computing system 2200 can include more or less components than those shown in FIG. 22. However, the components shown are sufficient to disclose an illustrative embodiment implementing the present solution. Notably, the hardware shown in FIG. 22 can include physical hardware and/or virtual hardware.

The hardware architecture of FIG. 22 represents one (1) embodiment of a representative computing device configured to facilitate the provision of a dynamic computer network in which behavior models drive cyber mission models. As such, the computing system 2200 implements methods of the present solution.

As shown in FIG. 22, the computing system 2200 includes a system interface 2212, a user interface 2202 (e.g., a keyboard for data input and a display for data output), a Central Processing Unit ("CPU") 2204, a system bus 2206, a memory 2208 connected to and accessible by other portions of the computing system 2200 through system bus 2206, and hardware entities 2210 connected to system bus 2206. System bus 2206 is also used to communicate one or more mission plans to and from the computing system 2200. At least some of the hardware entities 2210 perform actions involving access to and use of memory 2208, which can be a Random Access Memory ("RAM"), a disk driver and/or a Compact Disc Read Only Memory ("CD-ROM"). System interface 2212 allows the computing system 2200 to communicate directly or indirectly with external devices (e.g., sensors, servers and client computers).

Hardware entities 2210 can include microprocessors, Application Specific Integrated Circuits ("ASICs") and other hardware. Hardware entities 2210 can include a microprocessor programmed to facilitate the provision of a dynamic computer network in which behavior models drive cyber mission models.

As shown in FIG. 22, the hardware entities 2210 can include a disk drive unit 2216 comprising a computer-readable storage medium 2218 on which is stored one or more sets of instructions 2214 (e.g., software code) configured to implement one or more of the methodologies, procedures, or functions described herein. The instructions 2214 can also reside, completely or at least partially, within the memory 2208 and/or the CPU 2204 during execution thereof by the computing device 2200. The components 2208 and 2204 also can constitute machine-readable media. The term "machine-readable media", as used here, refers to a single medium or multiple media (e.g., a centralized or distributed database, and/or associated caches and servers) that store the one or more sets of instructions 2214. The term "machine-readable media", as used here, also refers to any medium that is capable of storing, encoding or carrying a set of instructions 2214 for execution by the computing device 2200 and that cause the computing device 2200 to perform any one or more of the methodologies of the present disclosure.

Notably, the present solution can be implemented in a single computing device as shown in FIG. 22. The present solution is not limited in this regard. Alternatively, the present solution can be implemented in a distributed network system. For example, the present solution can take advantage of multiple CPU cores over a distributed network of computing devices in a cloud or cloud-like environment. The distributed network architecture ensures that the computing time of the statistics and enhanced functionality is reduced to a minimum, allowing end-users to perform more queries and to receive reports at a faster rate. The distributed network architecture also ensures that the implementing software is ready for being deployed on an organization's internal servers or on cloud services in order to take advantage of its scaling abilities (e.g., request more or less CPU cores dynamically as a function of the quantity of data to process or the number of parameters to evaluate).

Distribution and Loading of Mission Plans

The distribution and loading of mission plans as disclosed herein will now be described in further detail. Referring once again to FIG. 1, it can be observed that the modules 105-107, 113, 114 are distributed throughout the network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g., maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Commands for controlling the operating states of the network are communicated over the network 100, or can be communicated by any other suitable means. For example, a separate wired or wireless network (not shown) can be used for that purpose.

Figure 6:
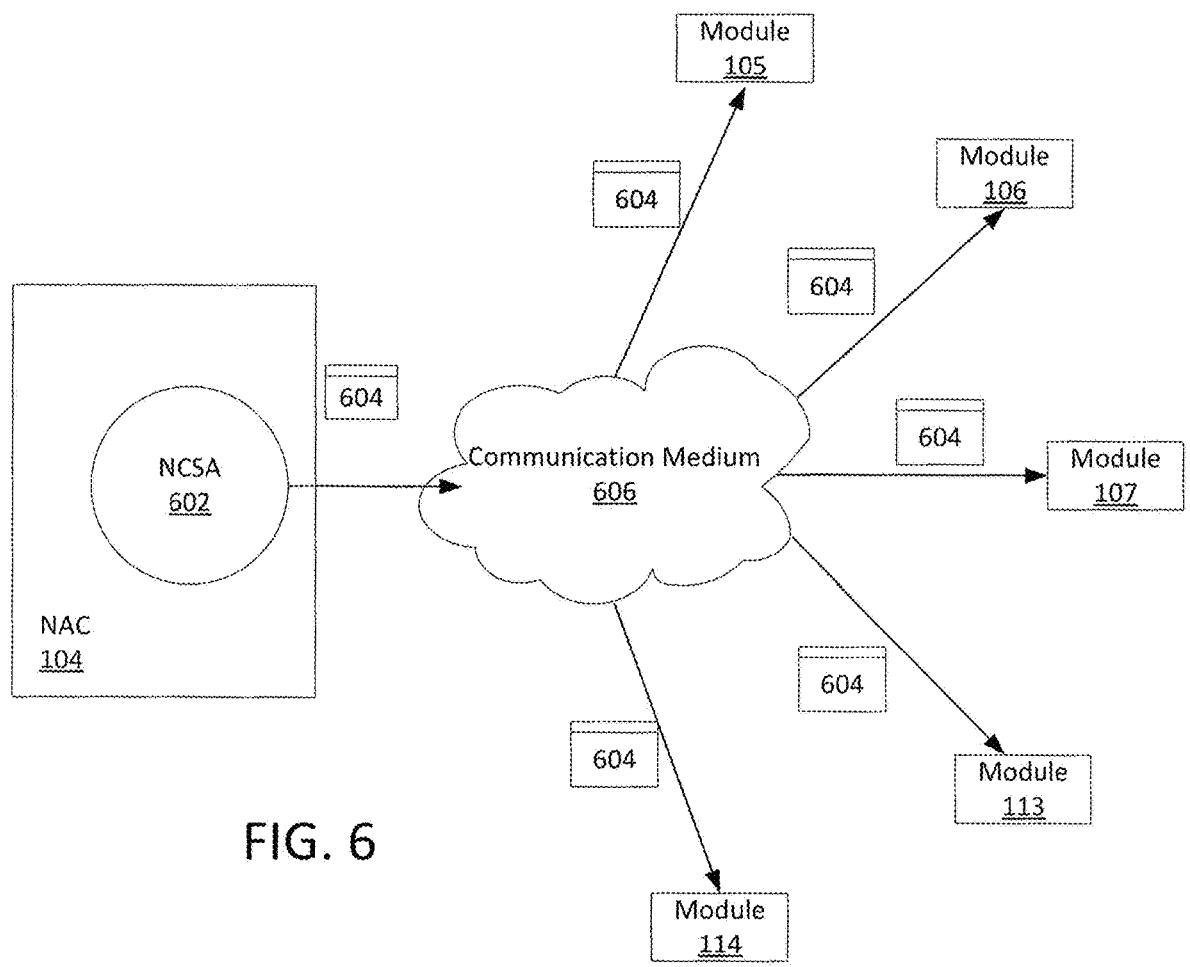
FIG. 6 is a diagram that is useful for understanding the way in which a mission plan can be communicated to a plurality of modules in the network in FIG. 1.
Figure 7:
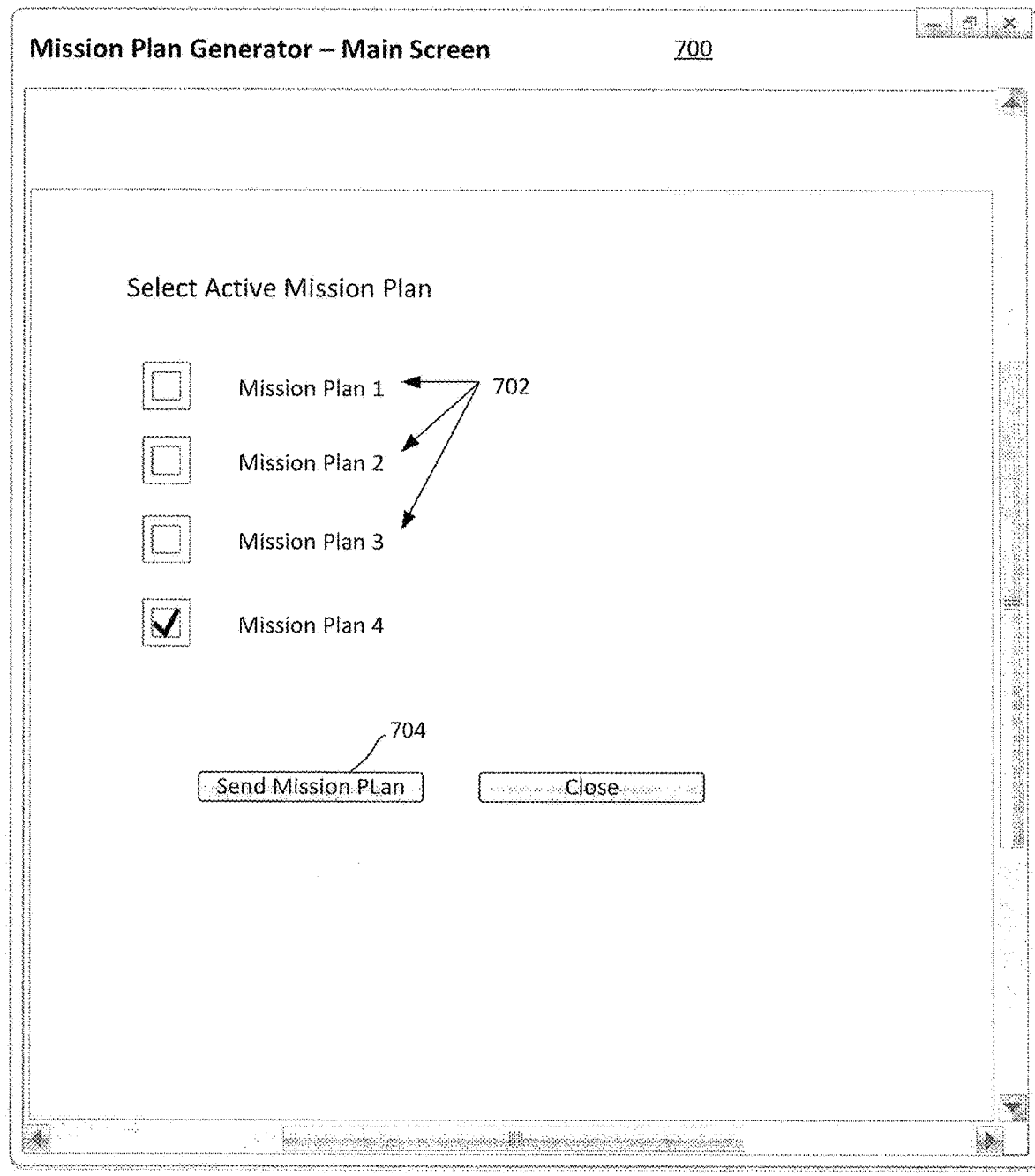
FIG. 7 is an example of a dialog box of a graphical user interface that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some scenarios include in-band signaling using computer network 100. Alternatively, an out-of-band network (e.g., a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a Send Mission Plan button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of IDPs as described herein. Such an arrangement minimizes the time during which the network operates in the clear and without manipulating IDPs. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that IDP values are varied. Once the new mission plan has been loaded, the modules 105-107, 113 and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various IDPs at each module 105, 106, 107, 113 and 114 can be controlled by the application software executing on each module 105-107, 113, 114. However, the behavior of the application software is advantageously controlled by the mission plan.

Dynamic Modification of Mission Plans

To address the inadequacy of defining and managing current analytics and metrics against the new cyber maneuver paradigm and maneuver schemes, the following is employed by the network: analytics and schemas defined using a common language and ontology so as to be in relationship to blocked and/or detected cyber-attacks; an ontology linked to the use of CBMs to drive the measurements of efficiency and effectiveness of defined mission plans or models in blocking cyber-attacks on the network; analytics and an underlying ontology linked to monetization models; and/or classes of analytics defined based on strength of maneuver behavior, tenet classes (e.g., entice, deceive, evade, protect, reveal, respond), shadow networking utilization, and/or various aspects of foundational math models (e.g., maneuver space size, distance vector analysis, set theory, graph theory graphs, OODA loop timing, and/or OODA loop speed). The importance of each of the listed features of the present solution will become evident as the discussion progresses.

During operation of the network, the mission objective(s), CBM(s) and/or mission plan(s) can be dynamically modified or changed. The dynamic modification/change occurs based on feedback information and analysis of effectiveness. A schematic illustration that shows an exemplary feedback process is provided in FIG. 23.

Figure 23:
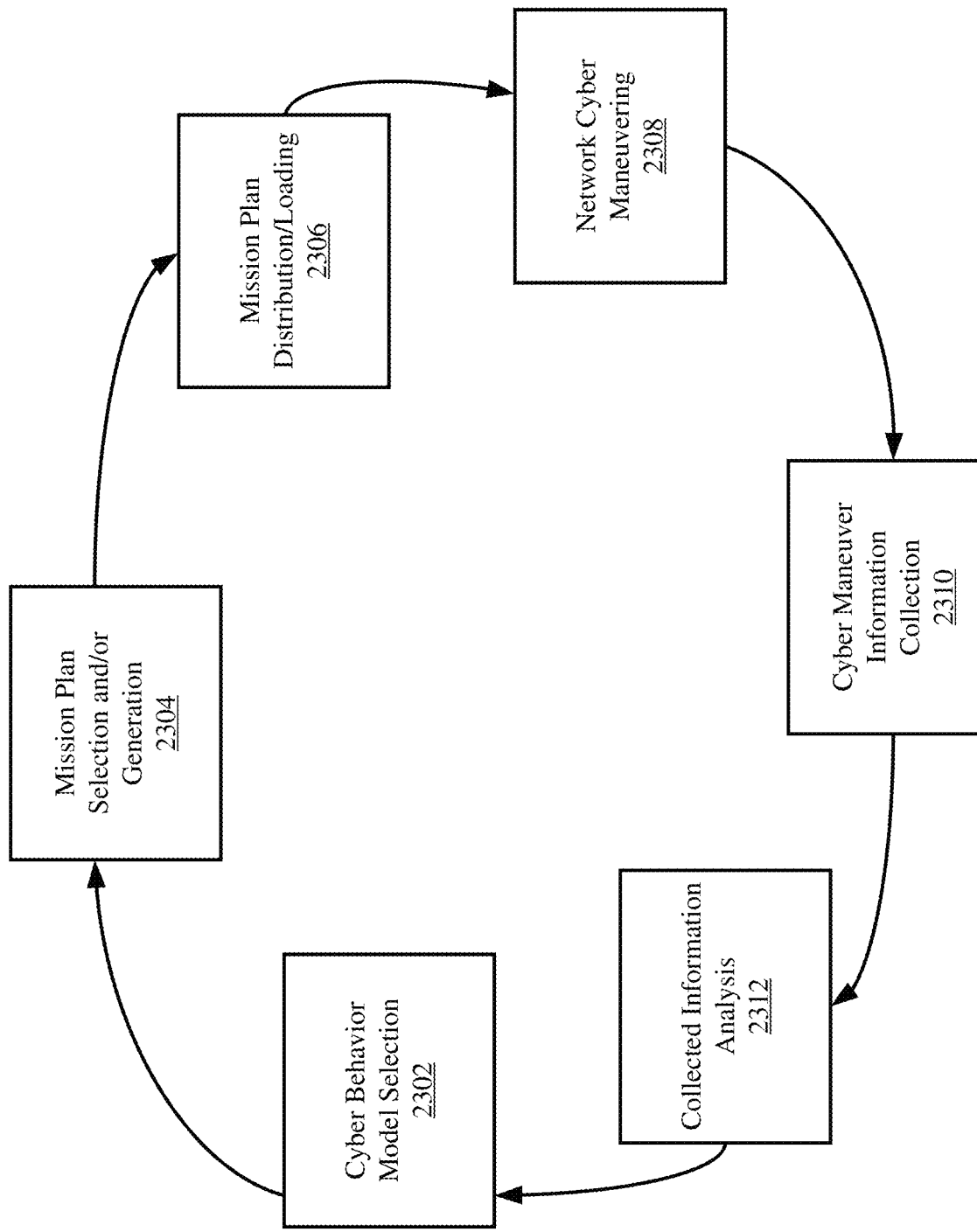
FIG. 23 is an illustration of an exemplary feedback process.

As shown in FIG. 23, at least one CBM is selected in functional block 2302. The particulars of the CBM selection process is described above. The selected CBM is then used to select or generate a mission plan as shown by functional block 2304. The mission plan selection/generation process is also described above. Next, the selected/generated mission plan is distributed and loaded on nodes of the network as shown by functional block 2306. Techniques for distributing and loading mission plans are discussed above. The network nodes perform cyber maneuvering as disclosed herein in accordance with the mission plan, as shown by functional block 2308. In blocks 2310-2312, information about the cyber maneuvering is collected and analyzed to determine the value of the CBMs and/or mission plans in stopping cyber-attacks. A new mission objective, CBM and/or mission plan may be automatically and/or dynamically selected and implemented in the network based on results of this analysis. Alternatively, the selection of the new mission objective, CBM and/or mission plan can be performed by or enabled by an operator based on the results of the analysis. Stated differently, a mission plan is dynamically modified by changing a mission objective and/or CBM criteria based on the feedback information relating to the cyber maneuverability.

Operations of functional blocks 2310 and 2312 are implemented on a computing device of the network. The computing device can be the same as or similar to the computing device 2200 described above in relation to FIG. 22.

In some scenarios, the collected information comprises information that is useful for determining a behavior effectiveness, how well a mission plan or model mimics the behavior, and/or how well the behavior is meeting the mission objectives. Cyber maneuver behaviors are the dynamic (random or sequential) constructions and transformations of the communication streams and packets within a network. In order to understand what behavior is being referenced here, it should be understood that the transformation of communications IDPs is performed to strengthen the resiliency of communications, networks, and computers against cyber-attacks. Behaviors and the models of behaviors can be taken from nature, man-made random algorithms (i.e., mathematics), randomly observed events and/or other things. Accordingly, the information includes, but is not limited to, a distance vector, an attack vector, a CBM metric (or CBM data structure metric), a network metric, a data metric, and/or a cost metric. Each of the listed metrics has a record structure, a point or collection of points, and a storage location. Each of the listed metrics can be counted as singular records, summations, rates, and/or velocities.

Figure 24:
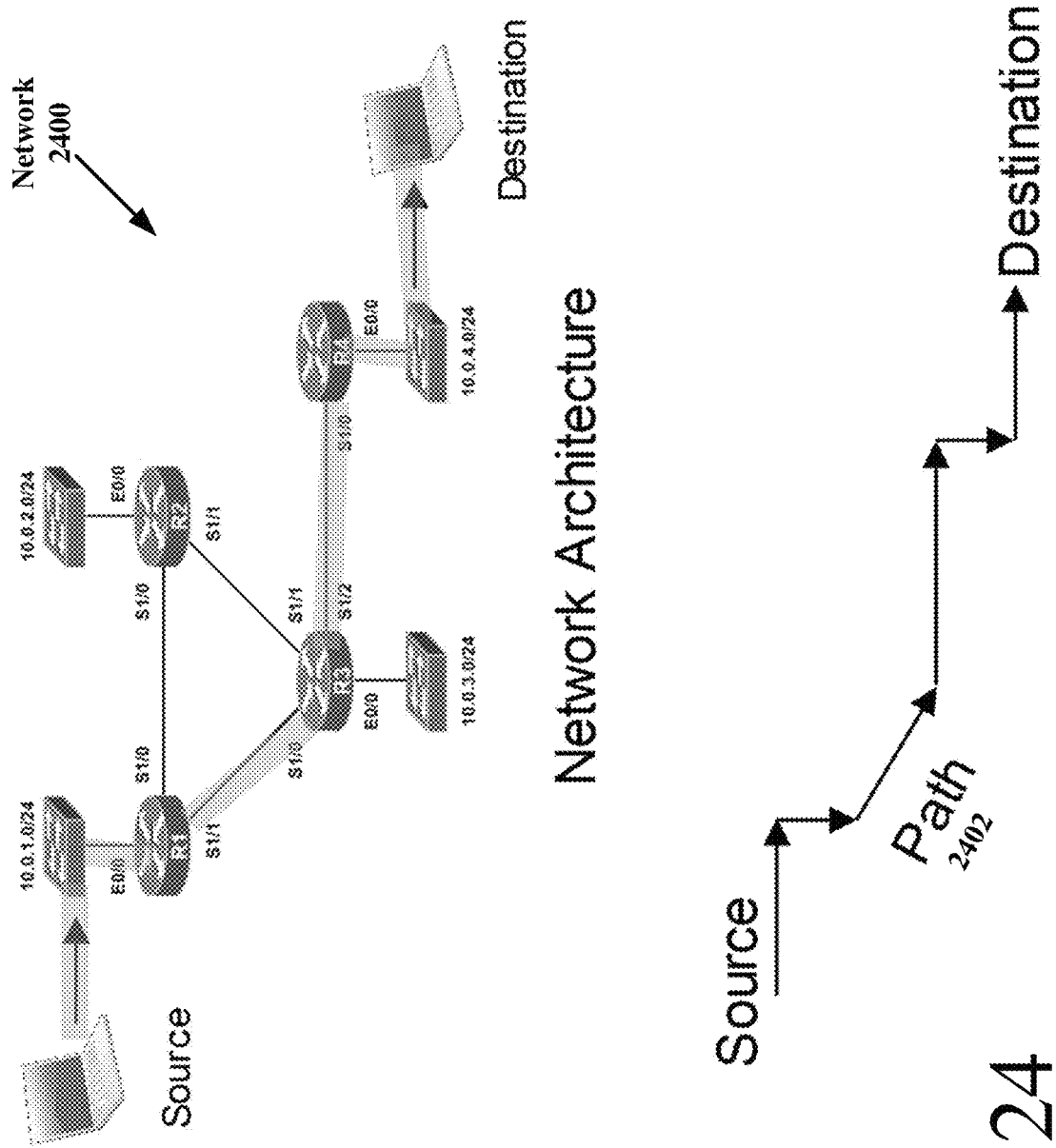
FIG. 24 is an illustration that is useful for understanding a communication path or pathway.

As noted above, the distance vector can be an actual physical distance along a communication path between first and second locations. The distance vector represents the number of network nodes that are present in a communication path between the first and second locations. An exemplary communication path 2402 through an exemplary network 2400 is shown in FIG. 24.

Figure 25:
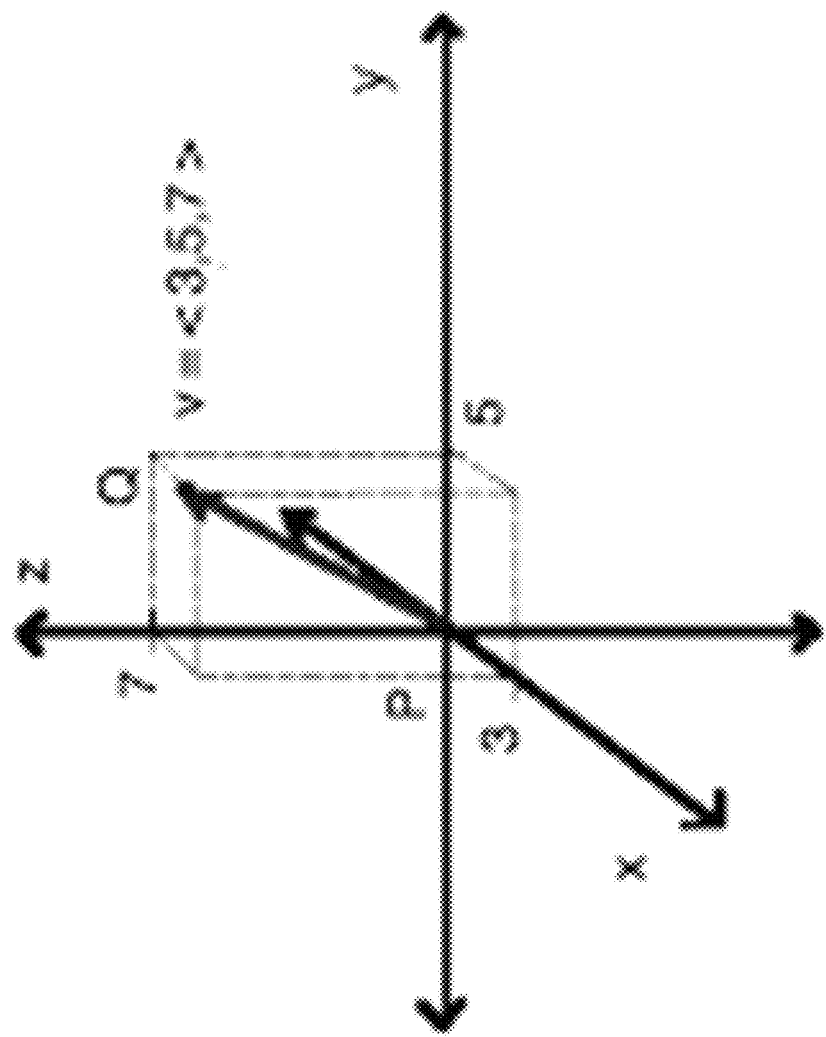
FIG. 25 is an illustration that is useful for understand vector analysis.
Figure 26:
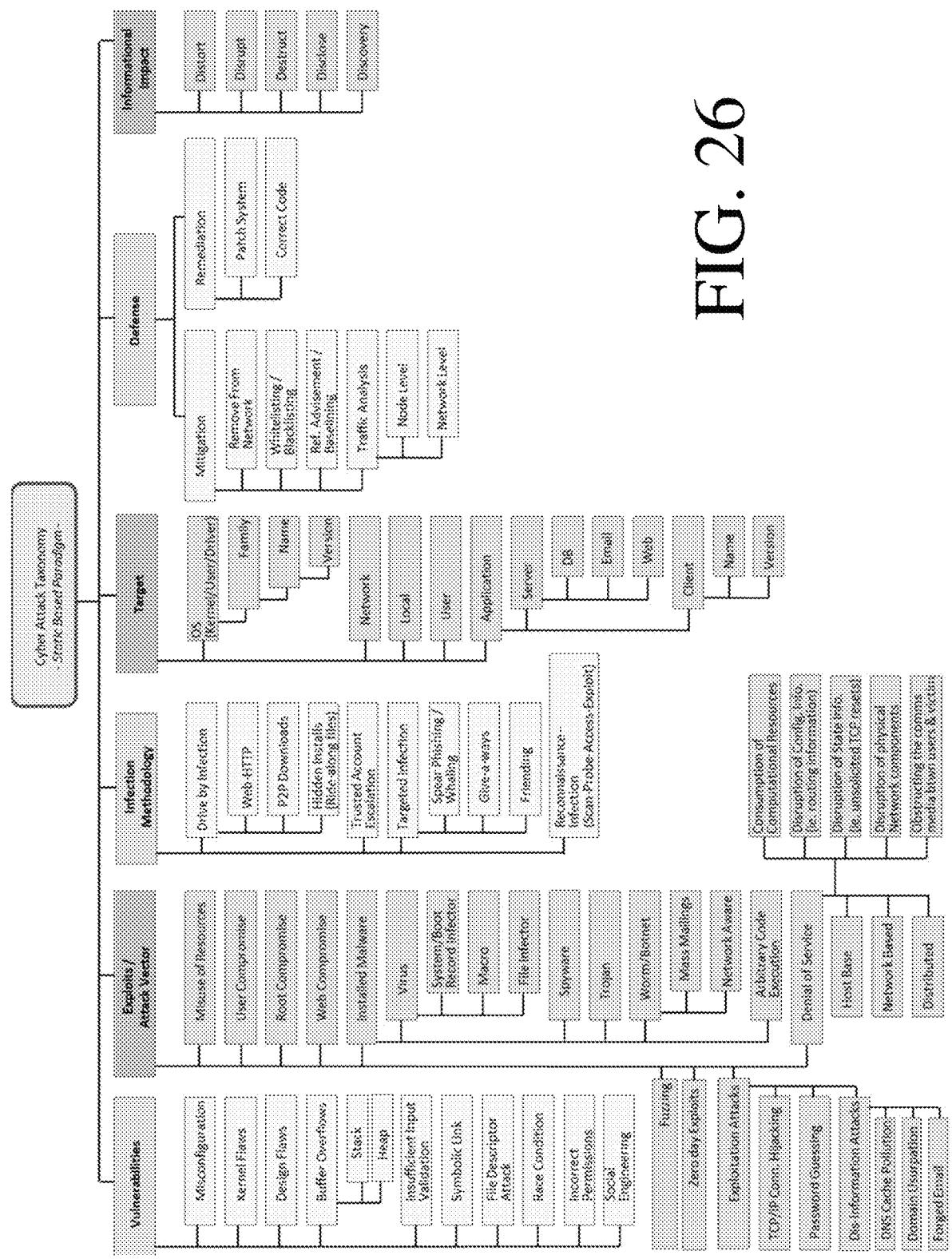
FIG. 26 is an illustration of an exemplary attack taxonomy.

The attack vector (or attack distance vector) represents the number of blocked cyber-attacks, the pathways the cyber-attacks took through the network, the behavior model(s) used when the cyber-attacks were detected, maneuver space size and parameters when the cyber-attacks were detected, and a history of the maneuver spaces. Given a distance vector analysis (e.g., vector analysis of FIG. 25), attack vectors can be described in the following manner: pathways from source to destination in a network described as a series of short vectors described with set theory; and infections carried in the payload described in an attack taxonomy shown in FIG. 26. The series of short vectors can include, but are not limited to, the following vectors.

Attack Distance Vector={source; pipes; . . . ; payload (vulnerabilities, exploit, infection mechanism); destination}
Data Distance Vector={source; elements of the communication model; destination}

Figure 27:
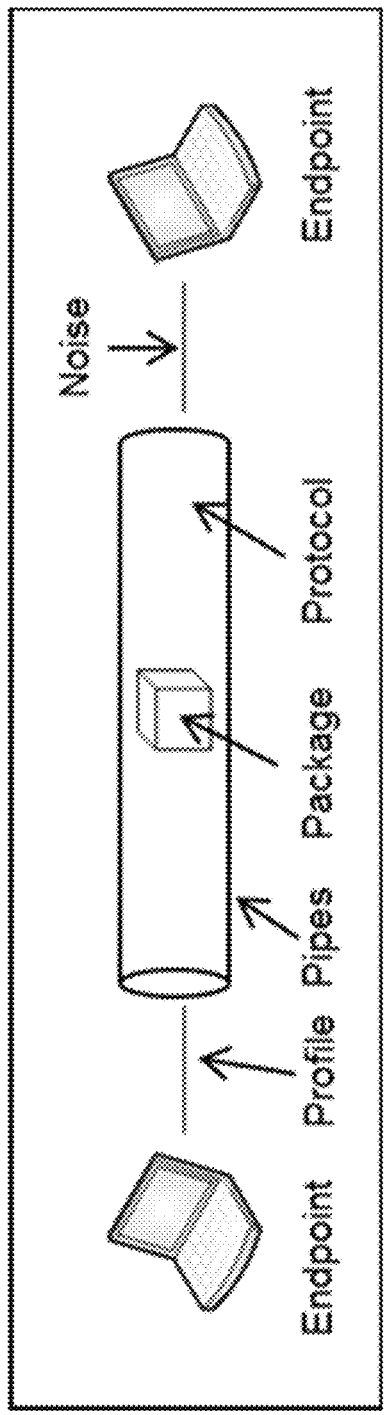
FIG. 27 is an illustration that is useful for understanding the elements of the attack distance vector.

A schematic illustration that is useful for understanding the elements of the attack distance vector is provided in FIG. 27. The attack vector is captured in shadow networking. Capturing the attack vector at any point allows the distance vector to be determined. The effectiveness of the behavior model can be calculated by comparing the unprotected path and the impact of the maneuver path.

A CBM data structure metric represents CBMs used to select/generate the mission plan(s) currently being executed by network nodes and/or parameters of the CBMs. The network metric represents network nodes at which IDP transformations/translations are being performed. The data metric representing a number of IDP transformations, values representing types of IDP transformations, velocities of IDP transformations, and/or rates of IDP transformations. The cost metric represents the monetary cost associated with the implementation of the given CBM(s).

The analysis performed in functional block 2312 can involve calculating an effectiveness of the CBM currently being employed by the network, i.e., how well the mission plan is at keeping cyber-attacks out of network. In some scenarios, the effectiveness is calculated in accordance with the following mathematical equation.

$$A_{PROBABILITY} = f(x) \cdot (N_{ATTACKS}/M_{SPACE})$$

wherein $A_{PROBABILITY}$ represents the probability of a cyber-attack, $N_{ATTACKS}$ represents a number of cyber-attacks, and $M_{SPACE}$ represents a maneuver space or cyber maneuver space. The phrases "maneuver space" and "cyber maneuver space", as used herein, means the limits (beginning and ending bounds) of the parameters of cyber maneuverability. These parameters include, but are not limited to, IDPs. The IDPs include, but are not limited to, IP addresses, MAC address, port numbers, packet sequence numbers, networks, data encryptions, communication profiles, and mathematical transformation algorithms. f(x) is a function having one or more of the following variables: maneuver variable(s) (e.g., defined by number of transformations and type of transformations); and cost variable(s) (e.g., cost of manual labor, cost of hardware, cost of software, cost of fixing results of cyber-attacks, cost of data compromise if stolen, etc.). Notably, if $M_{SPACE}$ is increased from a normal network space value of one (1), $A_{PROBABILITY}$ decreases. When a network maneuver is performed, $A_{PROBABILITY}$ is re-set to zero (0).

In other scenarios, the effectiveness is calculated in accordance with the following mathematical equation which equates the behavior to the amount of change in the number of cyber-attacks on the network. For example, if $X_0 < N_{ATTACKS} < X_1$, then continue using the current mission plan, where $X_0$ and $X_1$ are pre-defined integers. In contrast, if $N_{ATTACKS} > X_1$, then cause a new mission plan to be selected or generated to decrease the total number of successful cyber-attacks on the networks.

In those or other scenarios, the mission plan is additionally changed based on the expiration of a pre-defined time period or other criteria even though the computed effectiveness does not have a value for causing such change.

The following EXAMPLE is provided in order to further illustrate the present solution. The scope of the present solution, however, is not to be considered limited in any way thereby.

EXAMPLE

Let's assume a company has a series of business plans residing on a set of computer servers. The business plans detail the company's structure and marketing strategy, and are important for two (2) following reasons: (a) revealing them to competitors would have a significant negative impact on potential future national and international revenue; and (b) malicious modification of the business plans would also have a significant negative impact on potential future revenue. As such, the business plans and the networks in the data center must remain fully protected.

Figure 28:
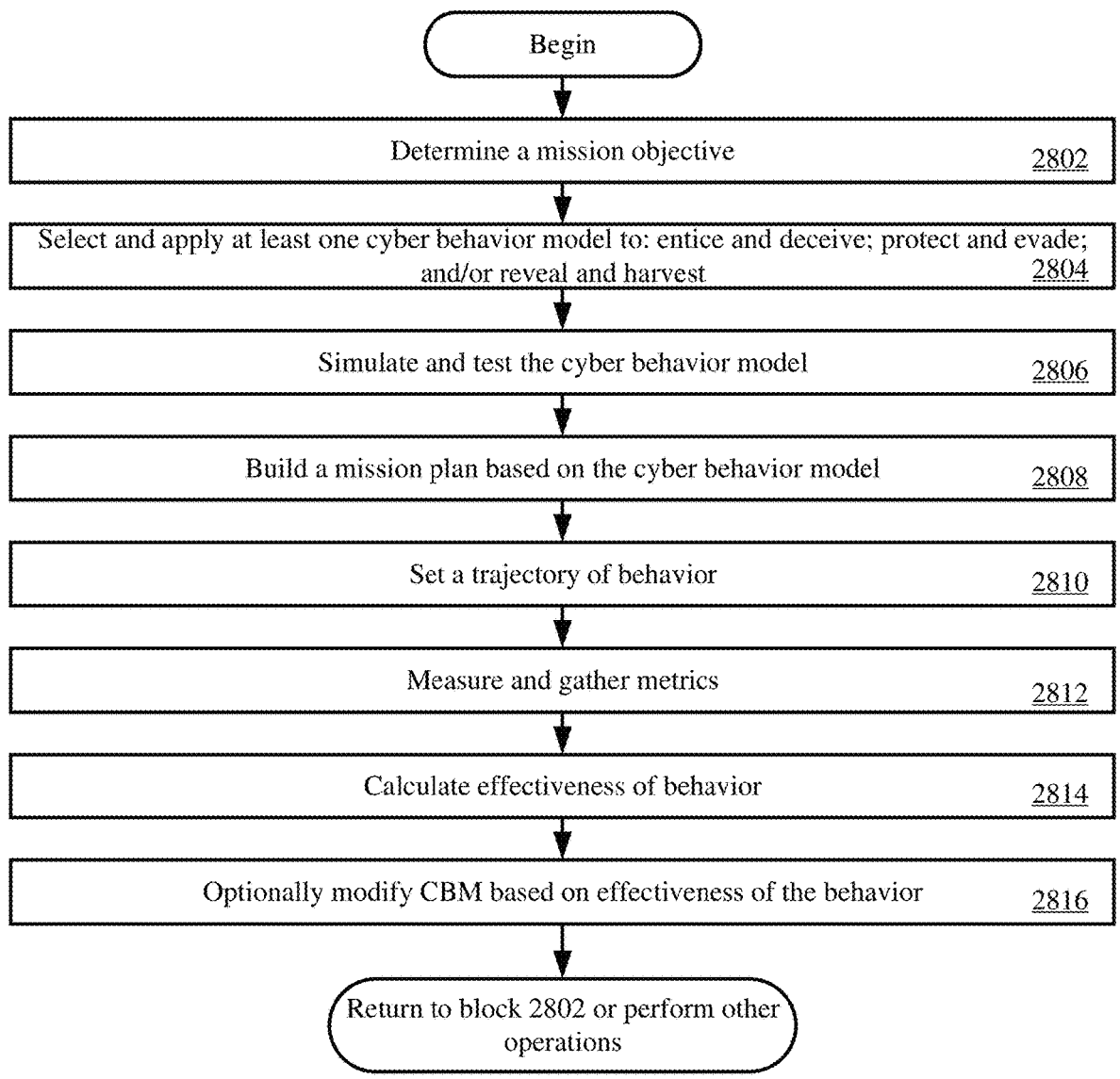
FIG. 28 is a flow diagram of an exemplary method for modifying a cyber-behavior model.

In order to provide such protection, a series of operations needs to be performed. A flow diagram of the operations is provided in FIG. 28. As shown in FIG. 28, a first operation is performed in block 2802 to determine a mission objective. The first operation sets the goal for system operations, protection and the corresponding cyber maneuverability. In this case, the mission objective is to protect the corporate business plans, residing on the servers in the corporate data center, from a cyber-attack. An adversary attack strategy is to locate, modify and expose the company network server's housing plans. A defense strategy is to protect the data center networks from reconnaissance, protect the data servers from compromise, and prevent data exploits (if the attack vectors can't reach the data, no attacks can harm the data).

Thereafter, second operations are performed in block 2804 to select and apply at least one CBM to: entice and deceive (e.g., use the changed IDPs to represent a server with false business plans); protect and evade (e.g., use maneuver to constantly shift attack profile such as by constantly changing the IDPs); and/or reveal and harvest (e.g., use shadow networking to identify all attack vectors, redirect the attack vector to an analysis system to understand the attack, and log the CBM metrics related to the shadow networking). The CBM metric logging can be additionally or alternatively performed independently of shadow networking. The CBM is then simulated and tested as shown by block 2806. Next in block 2808, the mission plan is built based on the CBM.

A trajectory is then set in block 2810. This is achieved by: operationally deploying a maneuver engine within the network; deploying and configuring the mission plan to the maneuver engine; activating the maneuver engine and mission manager; and validating that all system components are activated and functioning properly according to the mission plan.

Once the trajectory has been set, metrics are measured and gathered as shown by block 2812. According to the prescribed mission plan and the overall system configuration (system could describe and be equal to an enterprise network or a smaller LAN), one of the following events occurs: the system polls and receives the needed metrics from each of the areas in the network and each of the areas within the maneuver engine(s) (e.g., number of packets processed, number of attacks captured with shadow networking, etc.); and each area sends the needed metrics to a metric collector. Some metrics will be a single number (e.g., how many attacks are detected using shadow networking). Other metrics will be a complex record (e.g., attack vector path—source; pipes; . . . ; payload (vulnerabilities, exploit, infection mechanism); destination) and will require processing to properly and completely articulate the full metric.

Figure 31:
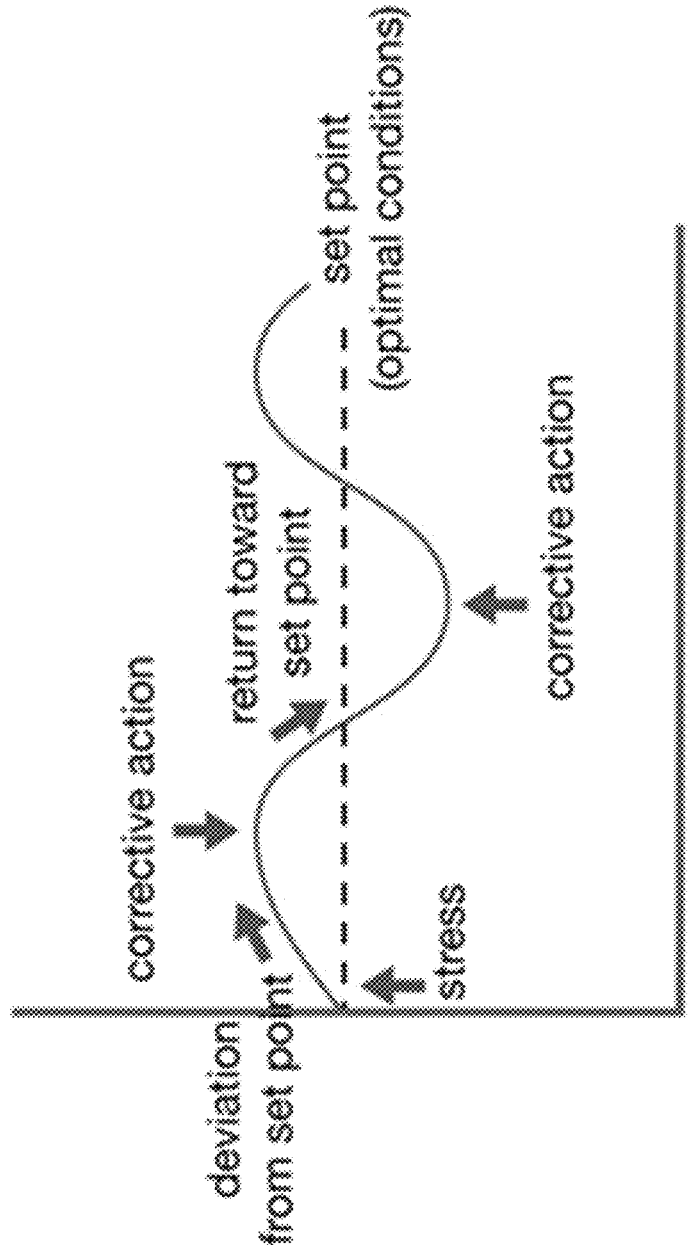
FIG. 31 provides a graph that is useful for understanding how a network's behavior effectiveness is variable over time.

The metrics are then used in block 2814 to calculate the effectiveness of the behavior. The effectiveness is determined by comparing a desired goal setting with an actual goal (milestone). The difference between the desired and actual goals represents the effectiveness of the behavior. If the effectiveness is zero (0) or equal to the pre-defined threshold value (e.g., as shown in FIG. 31), the measured trajectory (progress) of the behavior is exactly on path with the variance towards the desired goal. If the effectiveness is a positive value or greater than a pre-defined threshold value (e.g., as shown in FIG. 31), the measured trajectory (progress) of the behavior is better than desired goal. If the effectiveness is a negative value or less than the pre-defined threshold value (e.g., as shown in FIG. 31), the measured trajectory (progress) of the behavior indicates that the desired goal is not being met. In either the positive or negative case, a new objective needs to be set to take into account the new trajectory towards the goal or a goal needs to be adjusted to match the trajectory. For example, if attack vectors are found in the shadow networking, the CBM needs to be adjusted in block 2816 to prevent the attack vectors from reaching that network point. This could be adjusting the CBM or some other system parameter (e.g., new anti-virus filters). Using distance vector analysis, the attack path is identified and harvested, and the corresponding holes (weakness within the defense strategy) can be highlighted and changed or patched.

Referring now to FIG. 29, there is provided an illustration of an exemplary data structure for a record stored in a data store. Records are provided to facilitate the generation and management of CBMs, mission plans and mission models. Each record comprises a plurality of data fields. These fields can include, but are not limited to, a header field, an operational dashboard metrics field, and an operational insight metrics field. Each of the listed fields contains certain information. For example, the header field includes information specifying high level details regarding the collected metrics. The high level details include, but are not limited to, timeframe details and/or architecture details. The timeframe details include, but are not limited to, a date range and timeframe identifiers. The architecture details include, but are not limited to: CBM definitions; maneuver space definitions; shadow networking definitions; a network architecture; maneuver locations/points within the network architecture; and/or associated mission models within the network architecture. The operational dashboard metrics field includes information specifying details associated with an effectiveness of the computer network's behavior with regard to prevention of cyber-attack success. This information includes, but is not limited to: the number of maneuver elements; maneuver space size; cyber maneuver density (where cyber maneuver density equals $N_{ATTACKS}/M_{SPACE}$); maneuver velocity; number of good communication vectors; number of cyber-attack vectors stopped; number of cyber-attacks in shadow networking; effectiveness rating(s). The operational insight metrics field includes information specifying the strength and weakness of CBMs, mission models and/or mission plans. This information includes, but is not limited to: date(s); time(s); CBMs, mission models; mission plans; attack vector name(s) and/or label(s); identifiers for the shadow networking element capture location(s); instance of specific time; and/or background information for second degree correlation.

Figure 30:
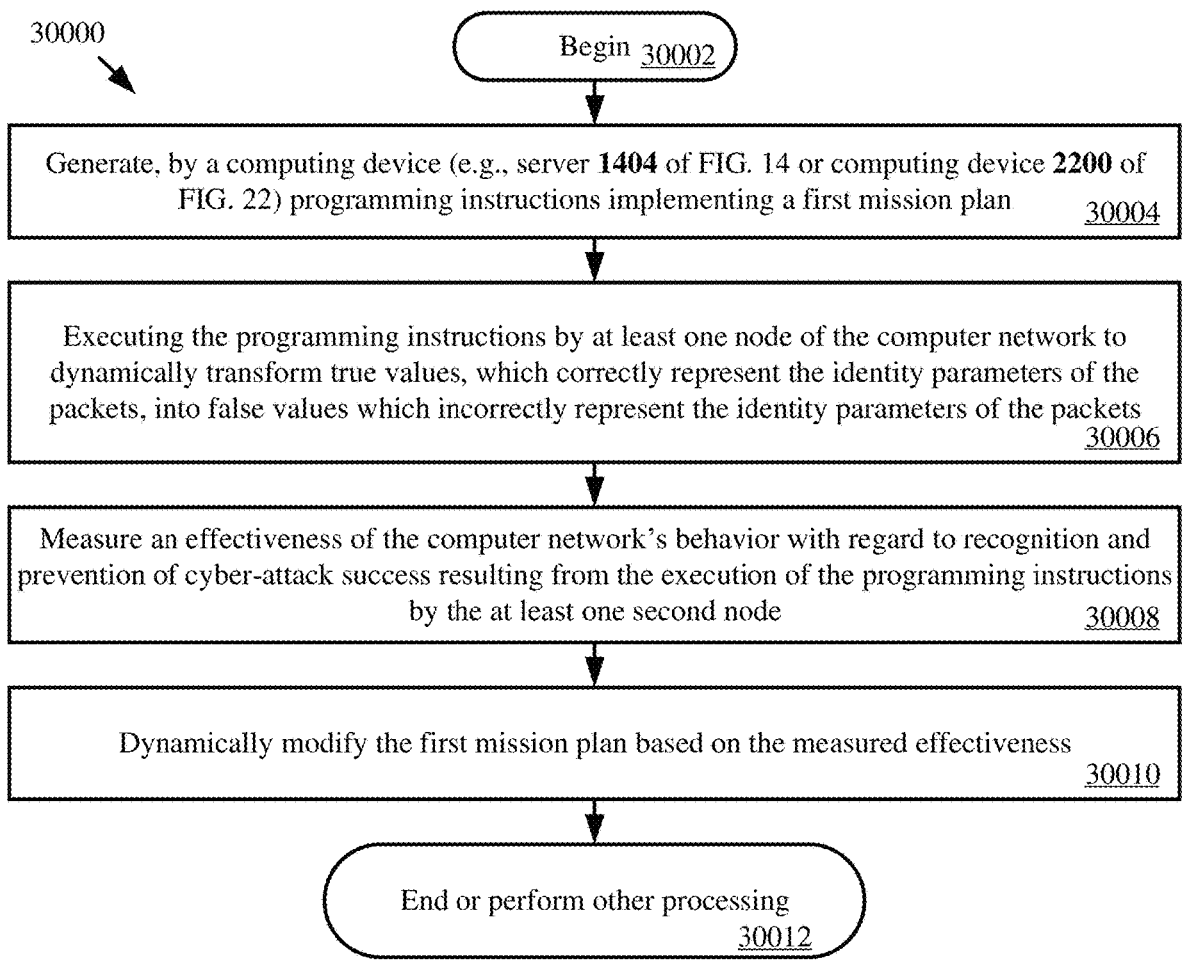
FIG. 30 is a flow diagram of an exemplary method for controlling operations of a computer network.

Referring now to FIG. 30, there is provided a flow diagram of an exemplary method 30000 for controlling operations of a computer network (e.g., network 100 of FIG. 1). The method begins with 30002 and continues with 30004 where a computing device (e.g., server 1404 of FIG. 14 or computing device 2200 of FIG. 22) generates programming instructions implementing a first mission plan. The first mission plan specifies which identity parameters of packets are to be transformed during specific time periods. Each identity parameter of the identity parameters uniquely identifies hardware and software of at least one first node of the computer network. The programming instructions are then executed by at least one second node of the computer network to dynamically transform true values, which correctly represent the identity parameters of the packets, into false values which incorrectly represent the identity parameters of the packets, as shown by 30006. An effectiveness of the computer network's behavior (with regard to the recognition and prevention of cyber-attack success resulting from the execution of the programming instructions by the at least one second node) is measured, as shown by 30008. The first mission plan is dynamically modified based on the measured effectiveness, as shown by 30010. Thereafter, method 30000 ends or other processing is performed.

The dynamic modification of the first mission plan may comprise: dynamically transforming the first mission plan into a second mission plan based on the measured effectiveness; dynamically modifying at least one parameter of the first mission plan based on the measured effectiveness; and/or replacing the first mission plan with a second mission plan based on the measured effectiveness.

In some scenarios, the effectiveness is measured by collecting information indicating how well the computer network's behavior mimics a desired behavior and how well the computer network's behavior meets a mission objective. The information comprises at least one of a distance vector, an attack vector, a Cyber Behavior Model ("CBM") metric, a network metric, a data metric, and a cost metric.

In those or other scenarios, the effectiveness is determined in accordance with the following mathematical equation $$A_{PROBABILITY} = f(x) \cdot (N_{ATTACKS}/M_{SPACE})$$

wherein $A_{PROBABILITY}$ represents the probability of a cyber-attack, $N_{ATTACKS}$ represents a number of cyber-attacks, $M_{SPACE}$ represents a maneuver space, and f(x) is a function. The function f(x) comprises at least one of a maneuver variable and a cost variable.

In those or yet other scenarios, the effectiveness is determined based on a relationship between the computer network's behavior and an amount of change in a number of cyber-attacks on the computer network. The effectiveness is determined based on a mathematical expression $X_0 < N_{ATTACKS} < X_1$, where $X_0$ and $X_1$ are pre-defined integers. The mission plan is dynamically modified when $N_{ATTACKS} > X_1$ to decrease a total number of successful cyber-attacks on the computer network.

Exemplary Module Operations

Figure 8:
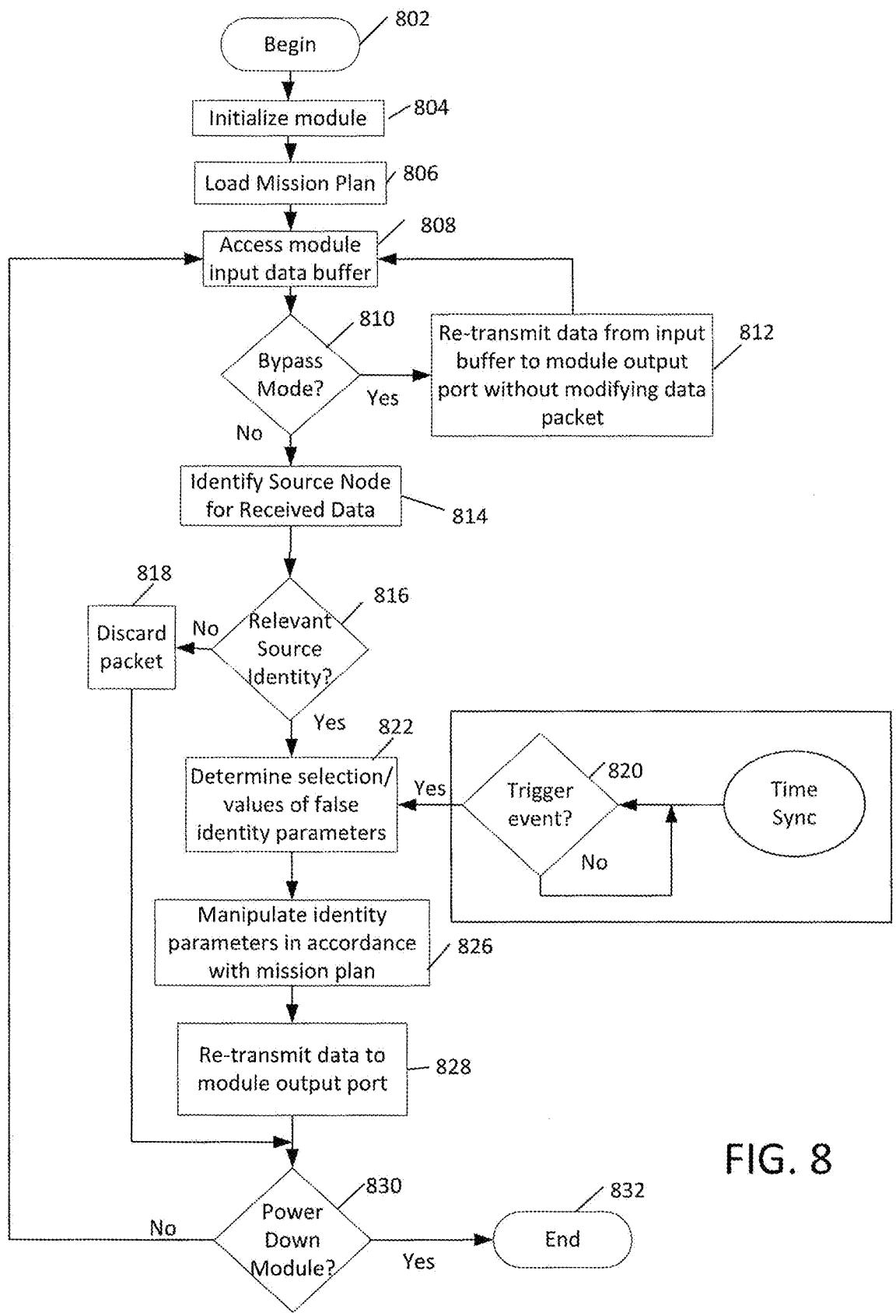
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process is described with respect to communications in a single direction. For example, in the case of module 105, the single direction could involve data transmitted from client computer 101 to hub 108. In practice however, modules 105-107, 113, 114 may operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node, then the packet is discarded in step 818. In step 820, the process checks to determine if a trigger event occurred. The occurrence of a trigger event will influence the selection of false identify values to use. Accordingly in step 822, the module determines the false identify values to use based on one or more of the trigger information, clock time and mission plan. The module then continues to step 826 where it manipulates IDPs of the data packet. Once manipulations are complete, the data packet is re-transmitted to an adjacent node from the output port of the module. In step 830, a determination is made as to whether the module has been commanded to power down. If so, the process ends at step 832. In step 808, the process continues and the next data packet is accessed from the module's input data buffer.

Exemplary Methods for Managing a Dynamic Computer Network

Figure 9:
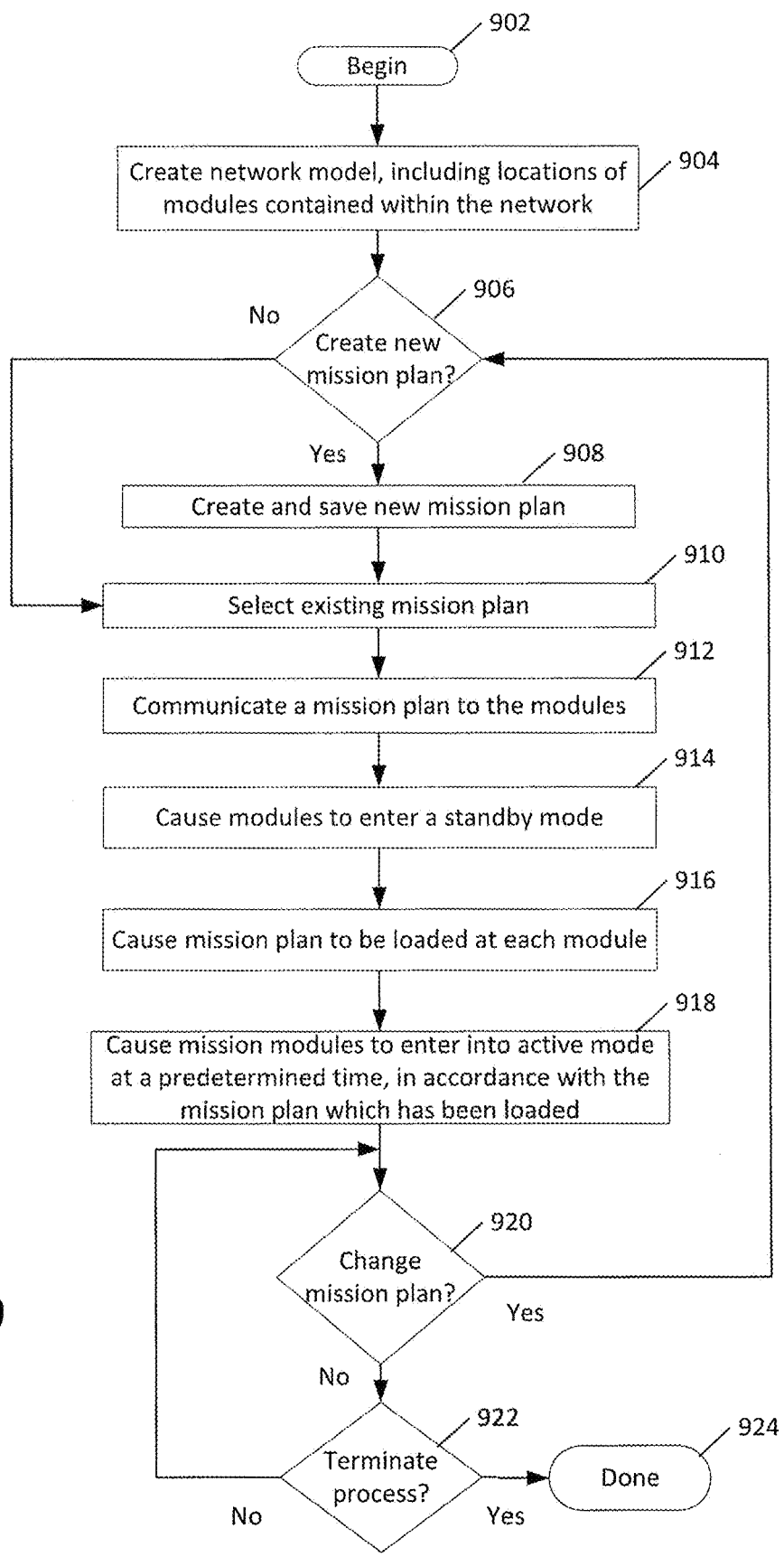
FIG. 9 is a flowchart that is useful for understanding the operation of a Network Control Software Application ("NCSA") in relation to creating and loading mission plans.

Referring now to FIG. 9, there is provided a flowchart which summarizes the methods described herein for managing a dynamic computer network. The process begins in step 902 and continues to step 904, where a network model is created (e.g., as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g., modules 105-107, 113, 114), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of IDPs. In step 918, the mission modules are again caused to enter into an active operational mode in which each mission module performs manipulations of IDPs in accordance with the mission plan. Steps 914, 916 and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desired to change the mission plan. If so, the process returns to step 906 where it continues as described above. If there is no indication that the user or network administrator wishes to change an existing mission plan, then the process determines in step 922 whether it has been instructed to terminate. If so, the process terminates in step 924. If no termination instruction is received, the process returns to step 920 and continues.

Exemplary Architectures for Various Components

Figure 10:
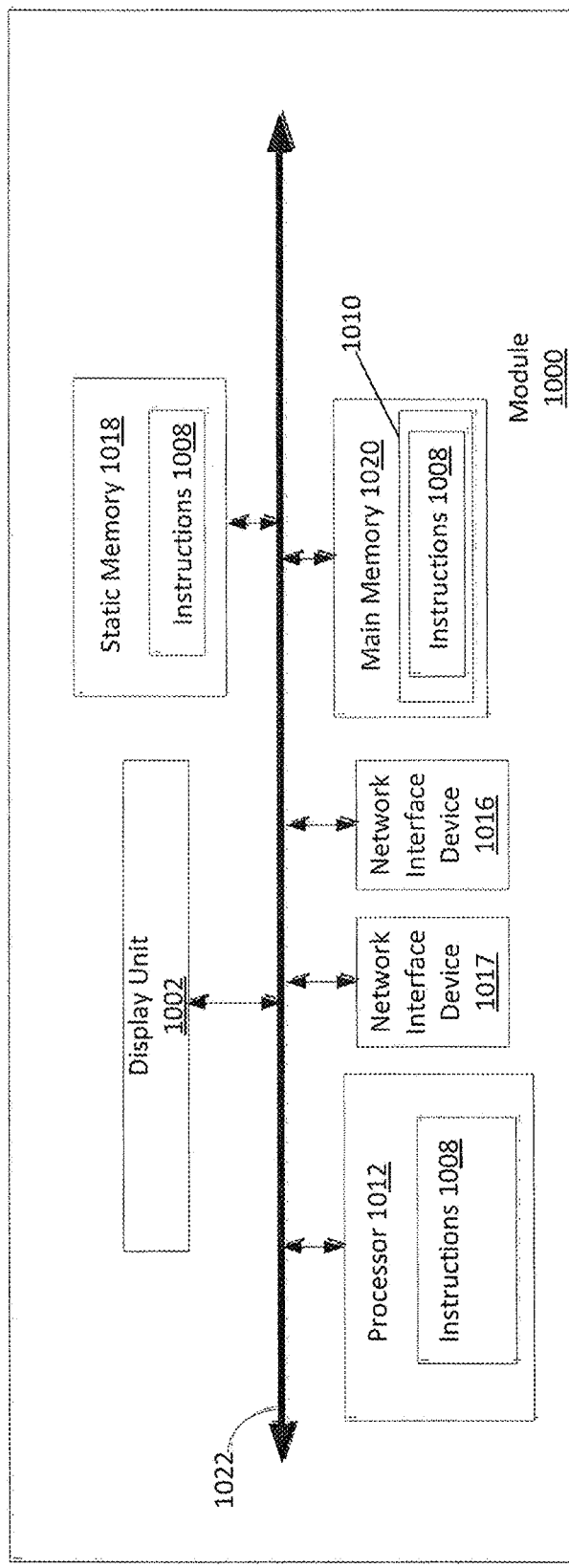
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of IDPs described herein. The module 1000 includes a processor 1012 (such as a Central Processing Unit ("CPU"), a main memory 1020 and a static memory 1018, which communicate with each other via a bus 1022. The computer system 1000 can further include a display unit 1002, such as a Liquid Crystal Display ("LCD") to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various scenarios, a network interface device 1016 connected to a network environment communicates over the network using the instructions 1008.

Figure 11:
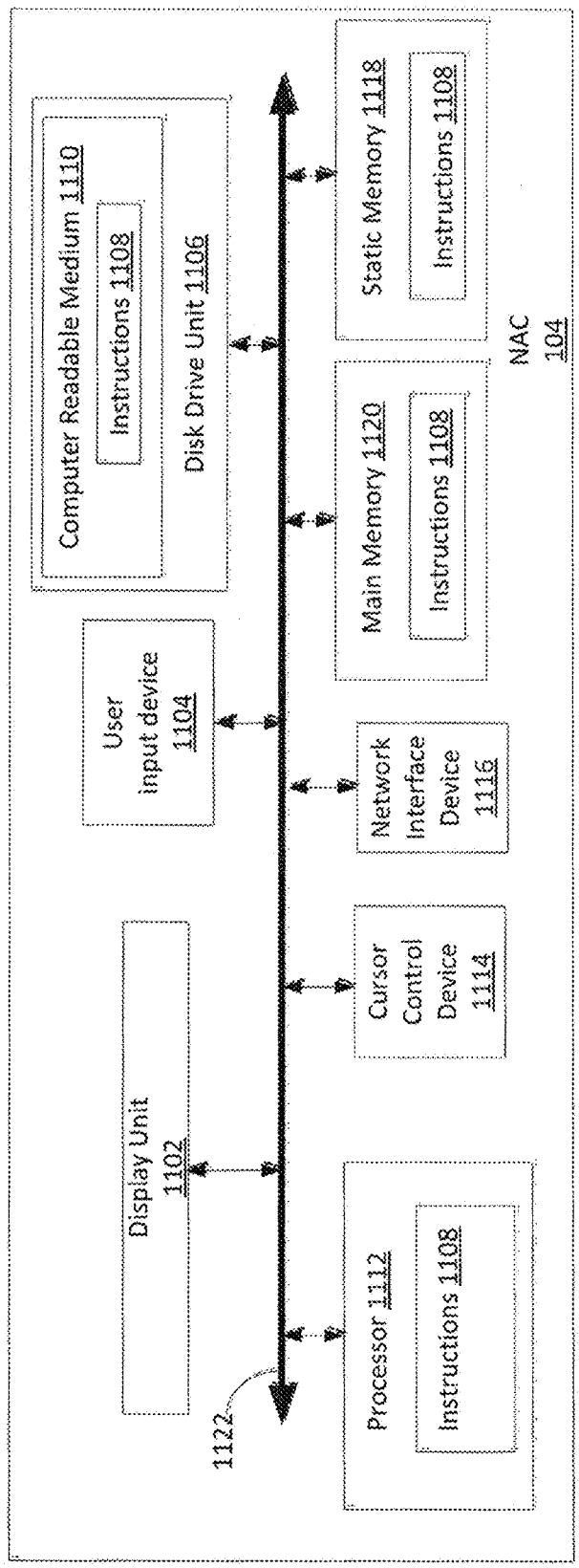
FIG. 11 is a block diagram of a computer architecture that can be used to implement the Network Administration Computer ("NAC") in FIG. 1.

Referring now to FIG. 11, there is shown an exemplary NAC 114 in accordance with the inventive arrangements. The NAC can comprise various types of computing systems and devices, including a server computer, a client user computer, a Personal Computer ("PC"), a tablet PC, a laptop computer, a desktop computer, a control system or any other device capable of executing a set of instructions (sequential or otherwise) that specifies actions to be taken by that device. Further, while a single computer is illustrated in FIG. 11, the phrase "NAC" shall be understood to include any collection of computing devices that individually or jointly execute a set (or multiple sets) of instructions to perform any one or more of the methodologies discussed herein.

Referring now to FIG. 11, the NAC 104 includes a processor 1112 (such as a central processing unit (CPU), a disk drive unit 1106, a main memory 1120 and a static memory 1118, which communicate with each other via a bus 1122. The NAC 104 can further include a display unit 1102, such as a video display (e.g., an LCD), a flat panel, a solid state display, or a Cathode Ray Tube ("CRT")). The NAC 104 can include a user input device 1104 (e.g., a keyboard), a cursor control device 1114 (e.g., a mouse) and a network interface device 1116.

The disk drive unit 1106 includes a computer-readable storage medium 1110 on which is stored one or more sets of instructions 1108 (e.g., software code) configured to implement one or more of the methodologies, procedures, or functions described herein. The instructions 1108 can also reside, completely or at least partially, within the main memory 1120, the static memory 1118, and/or within the processor 1112 during execution thereof. The main memory 1120 and the processor 1112 also can constitute machine-readable media.

Those skilled in the art will appreciate that the module architecture illustrated in FIG. 10 and the NAC architecture in FIG. 11, each represent merely one possible example of a computing device that can be used respectively for performing the methods described herein. However, the present solution is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various scenarios broadly include a variety of electronic and computer systems. Some implementations of the present solution may implement functions in two or more specific interconnected hardware devices with related control and data signals communicated between and through the modules, or as portions of an application-specific integrated circuit. Thus, the exemplary system is applicable to software, firmware, and hardware implementations.

In accordance with the present solution, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1110 is shown in FIGS. 10 and 11 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Communications with Computing Devices Outside the Dynamic Network

While the methods described herein for dynamic manipulation of IDPs can work well within a network 100, they do present some problems for communicating with computers outside the network 100. For example, computers outside of the network 100 will not be aware of the dynamic processes at work for manipulating IDPs. Accordingly, communications with computers outside the network 100 are likely to be disrupted if appropriate actions are not taken. Accordingly, the network 100 advantageously includes at least one bridge 115 which is arranged to process communications entering or leaving the network 100. The bridge ensures that such communications between computing devices within the network 100 and computing devices outside the network 100 can occur without errors.

The bridge 115 is a computing device that will have a functional block diagram that is similar to that of a module as shown in FIG. 2. The bridge 115 can also have a computer architecture that is similar to that which is shown in FIG. 10. The operations performed by the bridge 115 are similar to those performed by the modules 105-107, 113, 114. The bridge will receive data communications from network 100 and will manipulate IDPs in accordance with a mission plan before re-transmitting such data communications to a second network 124. In some scenarios, such manipulations will involve conversion of false IDPs back to true IDPs, where the true IDPs are determined based on information contained in the mission plan. Such an arrangement is sufficient where the second network does not dynamically modify IDP information.

In an alternative scenario, the second network 124 is a dynamic network that operates in a manner similar to the network 100. As such, the second network may have its own mission plan (second mission plan). In that case, the bridge will receive IDPs in a data communication from the first network, and will transform a first set of those IDPs having false values to instead have true values. The mission plan for the second network 124 can specify an entirely different dynamic network. For example, the mission plan for the second network can specify different IDPs to be modified, different trigger timing, and so on. Accordingly, the bridge will need to receive a message from the first network, correct the false values in the first set in accordance with the mission plan of the first network 100, and then dynamically modify the same (or different) IDPs in a second set in accordance with the mission plan of the second network. Once the second set of IDPs has been properly converted to false values, the data communication is transmitted to the second network.

It will be appreciated that the first set is determined in accordance with a first mission plan associated with the first network, and the second set is determined in accordance with a second mission plan associated with the second network. Similarly, the false information contained in said first set is determined in accordance with first mission plan and the false information contained in the second set is determined in accordance with the second mission plan. The first set of IDPs can be the same or different as compared to the second set of IDPs. Also, it should be appreciated that the first and second set can include all or some of the IDPs included in the data communication. The data communication will generally be a packet data communication containing a plurality of IDPs. The bridge will also receive data communications from second network 124, and will manipulate the IDPs in such data communications in accordance with the mission plan of the first network, the second network or both. For example, the bridge can receive a second data communication from the second data network, which can include a second plurality of IDPs. The second IDPs may or may not specify false information, depending on whether the second network dynamically modifies IDPs. If the second network does not dynamically modify IDPs, then the bridge only needs to use the mission plan associated with the first network to dynamically transform a set of the second plurality of IDPs to specify false information.

If the second network does dynamically modify IDPs, then the bridge will need to use the mission plan associated with the second network to convert a first set of the second plurality of IDPs (having false values) to true values. This step is preferably performed before the bridge uses the mission plan associated with the first network to transform a second set of the second plurality of IDPs to false values. The first and second set can be the same or different, and will be determined in each case by the mission plan for each network. Likewise, the transformations performed to convert IDPs to false values can be the same or different, and will depend on the mission plan associated with each network. Thereafter, the bridge will re-transmit such data communications to the network 100.

In some scenarios, the false IDPs for network 100, 124 are determined in accordance with a pseudorandom process. In that case, the pseudorandom process and/or the seed values for the pseudorandom process can be determined by the mission plan for the associated network. Likewise, the selection of IDPs to be manipulated can be determined by a pseudorandom process, where the process and/or the seed values for such process are respectively determined by the mission plan associated with each network. The bridge will make changes to the false IDP values and/or the selection of IDPs to be manipulated in accordance with the occurrence of one or more trigger event as described above with reference to the modules. Unlike the modules, the bridge 115 will need to perform such actions with respect to trigger events occurring with respect to the first and second networks.

Aside from the need to potentially manage dynamic operations associated with more than one mission plan, the operation of the bridge 115 is similar to that of the modules. Still, it should be appreciated that the operations of the bridge 115 is different as compared to the operation of the modules 105-107, 113, 114. For example, unlike the modules, the location where IDP manipulations are performed does not change in the case of the bridge 115. Instead, bridge 115 will always be in the active mode when at least one module in the network 100 is in the active mode, since the bridge forms a link with computing devices outside the network 100.

Figure 12:
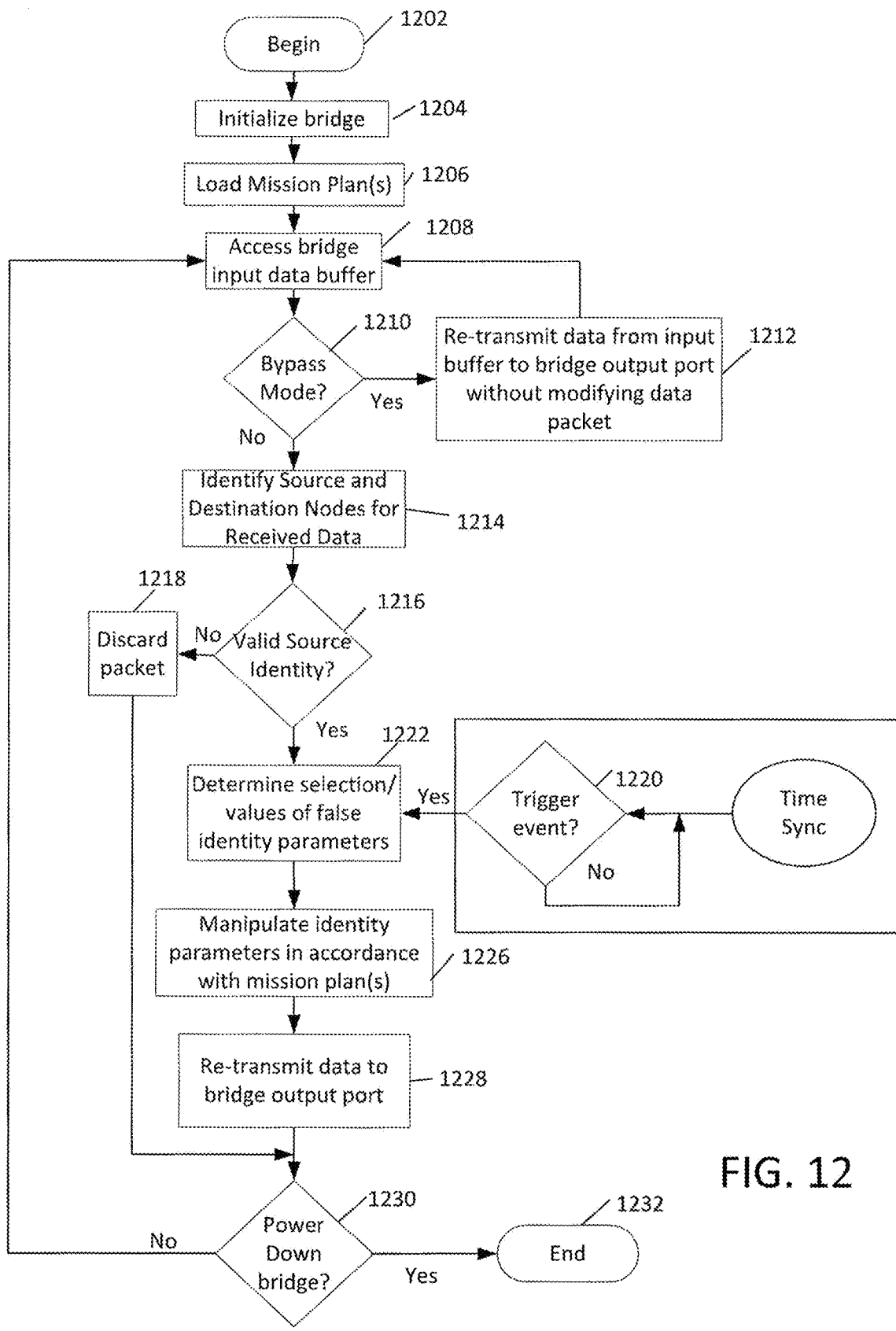
FIG. 12 is a flowchart that is useful for understanding the operation of a bridge in FIG. 1.

Referring now to FIG. 12, there is provided a flowchart which summarizes the operation of bridge 115. The process begins at step 1202 when the bridge is powered up and continues to step 1204 where bridge application software is initialized for executing the methods described herein. In step 1206, one or more mission plans are loaded from a memory location within the bridge. If the bridge is connected to a network that does not engage in dynamic manipulation of IDPs, then only a single mission plan is needed. However, if the bridge connects two or more networks that each dynamic modification of IDPs as described herein, then more than one mission plan will be loaded in step 1206. A first mission plan can define a dynamic maneuvering of a first network and a second mission plan can define a dynamic maneuvering of a second network. At this point, the bridge is ready to begin processing data and proceeds to do so at step 1208, where it accesses a data packet from an input data buffer of the bridge. In step 1210, the bridge checks to determine if it is in a bypass mode of operation. If so, the data packet accessed in step 1208 is retransmitted in step 1212 without any modification of the data packet. If the bridge is not in bypass mode, then it must be in its active mode of operation and continues on to step 1214.

In step 1214, the bridge reads the data packet to determine the identity of a source node from which the data packet originated, and the destination node. In step 1216, the bridge examines the data packet to determine if the source node valid. This can be accomplished by comparing the source node specified in the data packet to a current list of valid source nodes. If source node information is not valid then the packet is discarded in step 1218. In step 1220, the process checks to determine if a trigger event has occurred. This is an important step because the occurrence of a trigger event can have a significant effect upon the calculation of proper false identify values. If the bridge is using two or more mission plans, this step includes determining whether trigger events have occurred with respect to either mission plan. Notably, each mission plan can involve different trigger events.

The source and destination address information of the received data is important because it is needed to permit the bridge to determine how to properly manipulate the IDPs contained within the data communication. Once this information has been determined, the bridge then continues to step 1222 where it determines a selection/values of false IDPs. The process then continues on to step 1226 at which the bridge manipulates IDPs of the data packet in accordance with one or more mission plans. Once manipulations are complete, the data packet is re-transmitted at 1228 to an adjacent node from the output port of the bridge. In step 1230, a determination is made as to whether the bridge has been commanded to power down. If so, the process ends at step 1232. Otherwise, the process returns to 1208. In step 1208, the process continues and the next data packet is accessed from the bridge's input data buffer. As explained above, the type of manipulations performed at step 1216 will depend upon the source and destination of the data communications, and whether there is one, or more than one, networks that are being dynamically maneuvered.

Types of IDPs that can be Varied

Referring now to FIG. 13, there is provided a list of various IDPs that can be manipulated in accordance with the inventive arrangements. The list is not intended to be exclusive and other IDPs can also be manipulated without limitation. A brief discussion The list shown in FIG. 13 includes some IDPs that can be manipulated by the modules 105-107, 113, 114 and/or by bridge 115. Each of the parameters listed in FIG. 13 is included in a data communication included in a network using a TCP/IP communication protocol. Most of the information types listed in FIG. 13 are well known to those skilled in the art. However, a brief description of each type of information and its use as an IDP is provided herein. Also provided is a brief discussion of the ways in which each IDP can be manipulated.

IP Address. An IP Address is a numerical identifier assigned to each computing device participating in a computer network where the network uses the well known Internet Protocol for communication. The IP address can be a thirty-two (32) bit or one hundred twenty-eight (128) bit number. For purposes of the present solution, the IP address number can be changed to a false value that is selected randomly (e.g., using a pseudorandom number generator). Alternatively, the false IP address value can be randomly selected from a predetermined list of false values (e.g., a list specified by a mission plan). The source and destination IP addresses are included in TCP header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present solution, the source and/or destination MAC address can be changed to a false value that is selected randomly (e.g., using a pseudorandom number generator). Alternatively, the false MAC value can be randomly selected from a predetermined list of false values (e.g., a list specified by a mission plan). The source and destination MAC addresses are included in IP header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some scenarios, the IP address can be thought of as a single IDP. However, an IP address is generally defined as including at least two parts which include a network prefix portion and a host number portion. The network prefix portion identifies a network to which a data packet is to be communicated. The host number identifies the particular node within a Local Area Network ("LAN"). A sub-network (sometimes referred to as a subnet) is a logical portion of an IP network. Where a network is divided into two or more sub-networks, a portion of the host number section of the IP address is used to specify a subnet number. For purposes of the present solution, the network prefix, the subnet number and the host number can each be considered to be a separate IDP. Accordingly, each of these IDPs can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable IDPs that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present solution, the TCP sequence number can be manipulated as an IDP in accordance with a pseudorandom process. For example, the TCP sequence number can be changed to a false value that is selected randomly (e.g. using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other IDPs discussed here, the port number information can be manipulated or transformed to a false value in accordance with a pseudorandom process at a first module. The port information can later be transformed from a false value to a true value at a second module, using an inverse of the pseudorandom process.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described scenarios. Rather, the scope of the present solution should be defined in accordance with the following claims and their equivalents.

We claim:

1. A method for controlling operations of a computer network, comprising:
generating, by a first computing device, programming instructions implementing a first mission plan specifying which identity parameters of packets are to be transformed during specific time periods, each identity parameter of the identity parameters uniquely identifying hardware and software of at least one first node of the computer network;
executing the programming instructions by at least one second node of the computer network to dynamically transform true values, which correctly represent the identity parameters of the packets, into false values which incorrectly represent the identity parameters of the packets;
measuring an effectiveness of the computer network's behavior with regard to a recognition and prevention of cyber-attack success resulting from the execution of the programming instructions by the at least one second node; and
dynamically modifying the first mission plan based on the measured effectiveness;
wherein the effectiveness is determined in accordance with the following mathematical equation $A_{PROBABILITY} = f(x) \cdot (N_{ATTACKS}/M_{SPACE})$, where $A_{PROBABILITY}$ represents the probability of a cyber-attack, $N_{ATTACKS}$ represents a number of cyber-attacks, $M_{SPACE}$ represents a maneuver space, and $f(x)$ is a function.

2. The method according to claim 1, wherein the dynamic modification of the first mission plan comprises dynamically transforming the first mission plan into a second mission plan based on the measured effectiveness.

3. The method according to claim 1, wherein the dynamic modification of the first mission plan comprises dynamically modifying at least one parameter of the first mission plan based on the measured effectiveness or replacing the first mission plan with a second mission plan based on the measured effectiveness.

4. The method according to claim 1, wherein the effectiveness is measured by collecting information indicating how well the computer network's behavior mimics a desired behavior and how well the computer network's behavior meets a mission objective.

5. The method according to claim 4, wherein the information comprises at least one of a distance vector, an attack vector, a Cyber Behavior Model ("CBM") metric, a network metric, a data metric, and a cost metric.

6. The method according to claim 1, wherein the function f(x) comprises at least one of a maneuver variable and a cost variable.

7. The method according to claim 6, wherein the effectiveness is determined based on a relationship between the computer network's behavior and an amount of change in a number of cyber-attacks on the computer network.

8. The method according to claim 7, wherein the effectiveness is determined based on a mathematical expression $X_0 < N_{ATTACKS} < X_1$, where $X_0$ and $X_1$ are pre-defined integers.

9. The method according to claim 8, wherein the mission plan is dynamically modified when $N_{ATTACKS} > X_1$ to decrease a total number of successful cyber-attacks on the computer network.

10. A system, comprising:
at least one processor comprising a circuit;
a non-transitory computer-readable medium comprising first programming instructions that, when executed, cause the at least one processor to perform data processing operations at a computing device, wherein the first programming instructions comprise instructions to:
generate second programming instructions implementing a first mission plan specifying which identity parameters of packets are to be transformed during specific time periods, each identity parameter of the identity parameters uniquely identifying hardware and software of at least one first node of a computer network;
cause at least one second node of the computer network to execute the second programming instructions to dynamically transform true values, which correctly represent the identity parameters of the packets, into false values which incorrectly represent the identity parameters of the packets;
measure an effectiveness of the computer network's behavior with regard to a recognition and prevention of cyber-attack success resulting from the execution of the programming instructions by the at least one second node; and
dynamically modify the first mission plan based on the measured effectiveness;
wherein the effectiveness is determined in accordance with the following mathematical equation $A_{PROBABILITY} = f(x) \cdot (N_{ATTACKS}/M_{SPACE})$, where $A_{PROBABILITY}$ represents the probability of a cyber-attack, $N_{ATTACKS}$ represents a number of cyber-attacks, $M_{SPACE}$ represents a maneuver space, and $f(x)$ is a function.

11. The system according to claim 10, wherein the dynamic modification of the first mission plan comprises dynamically transforming the first mission plan into a second mission plan based on the measured effectiveness.

12. The system according to claim 10, wherein the dynamic modification of the first mission plan comprises dynamically modifying at least one parameter of the first mission plan based on the measured effectiveness or replacing the first mission plan with a second mission plan based on the measured effectiveness.

13. The system according to claim 10, wherein the effectiveness is measured by collecting information indicating how well the computer network's behavior mimics a desired behavior and how well the computer network's behavior meets a mission objective.

14. The system according to claim 13, wherein the information comprises at least one of a distance vector, an attack vector, a Cyber Behavior Model ("CBM") metric, a network metric, a data metric, and a cost metric.

15. The system according to claim 10, wherein the function $f(x)$ comprises at least one of a maneuver variable and a cost variable.

16. The system according to claim 15, wherein the effectiveness is determined based on a relationship between the computer network's behavior and an amount of change in a number of cyber-attacks on the computer network.

17. The system according to claim 16, wherein the effectiveness is determined based on a mathematical expression $X_0 < N_{ATTACKS} < X_1$, where $X_0$ and $X_1$ are pre-defined integers.

18. The system according to claim 17, wherein the mission plan is dynamically modified when $N_{ATTACKS} > X_1$ to decrease a total number of successful cyber-attacks on the computer network.

19. A method for controlling operations of a computer network, comprising:
generating, by a first computing device, programming instructions implementing a first mission plan specifying which identity parameters of packets are to be transformed during specific time periods, each identity parameter of the identity parameters uniquely identifying hardware and software of at least one first node of the computer network;
executing the programming instructions by at least one second node of the computer network to dynamically transform true values, which correctly represent the identity parameters of the packets, into false values which incorrectly represent the identity parameters of the packets;
measuring an effectiveness of the first mission plan after execution of the programming instructions based on an inverse proportion relationship between a probability of a cyber-attack and a maneuver space $M_{SPACE}$; and
dynamically modifying the first mission plan based on the measured effectiveness.

* * * * *